(12) United States Patent
Tsuji et al.

(10) Patent No.: US 10,018,983 B2
(45) Date of Patent: Jul. 10, 2018

(54) PLC SYSTEM AND ARITHMETIC-EXPRESSION-DATA-CREATION SUPPORTING APPARATUS

(71) Applicant: Mitsubishi Electric Corporation, Tokyo (JP)

(72) Inventors: Takuro Tsuji, Tokyo (JP); Satoru Ukena, Tokyo (JP); Koichi Ishida, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 232 days.

(21) Appl. No.: 14/906,175

(22) PCT Filed: Jul. 14, 2014

(86) PCT No.: PCT/JP2014/068734
§ 371 (c)(1),
(2) Date: Jan. 19, 2016

(87) PCT Pub. No.: WO2016/009485
PCT Pub. Date: Jan. 21, 2016

(65) Prior Publication Data
US 2016/0187865 A1    Jun. 30, 2016

(51) Int. Cl.
*G05B 15/00* (2006.01)
*G05B 19/05* (2006.01)

(52) U.S. Cl.
CPC ......... *G05B 19/056* (2013.01); *G05B 19/054* (2013.01); *G05B 2219/13004* (2013.01)

(58) Field of Classification Search
CPC ............... G05B 19/056; G05B 19/054; G05B 2219/13004
(Continued)

(56) References Cited

U.S. PATENT DOCUMENTS

| 5,553,297 A | * | 9/1996 | Yonezawa ............ G05B 19/052 700/18 |
| 2013/0185620 A1 | * | 7/2013 | Tomita ...................... G06F 9/30 715/227 |

FOREIGN PATENT DOCUMENTS

CN       102004613 A     4/2011
DE    10 2007 062453 A1   6/2009
(Continued)

OTHER PUBLICATIONS

Communication dated Mar. 9, 2017, mailed from the State Intellectual Property Office of People's Republic of China in corresponding Application No. 201480042337.7.
(Continued)

*Primary Examiner* — Fernando Hidalgo
(74) *Attorney, Agent, or Firm* — Sughrue Mion, PLLC; Richard C. Turner

(57) ABSTRACT

A PLC system includes a programmable logic controller including a PLC unit and a storing unit and an arithmetic-expression-data-creation supporting apparatus causing the PLC unit to create arithmetic expression data of an arithmetic expression to be executed by the PLC unit, and the arithmetic-expression-data-creation supporting apparatus includes an input unit to receive, from a user, the arithmetic expression including input information serving as a variable used in an arithmetic operation and a constant used in the operation and an arithmetic-expression processing unit to obtain a calculation sequence of the expression, and the storing unit retains an arithmetic-expression-data table for managing the arithmetic expression data including the input information, the constant and the calculation sequence, and the PLC unit includes an operation unit connected to the storing unit, to execute an arithmetic operation of the
(Continued)

arithmetic expression according to the calculation sequence using the input information and the constant.

8 Claims, 19 Drawing Sheets

(58) Field of Classification Search
USPC .......................................................... 700/83
See application file for complete search history.

(56) References Cited

FOREIGN PATENT DOCUMENTS

| DE | 102007062453 | * | 6/2009 |
| DE | 11 2011 105402 T5 | | 4/2014 |
| DE | 112011105402 | * | 4/2014 |
| JP | 07-044090 A | | 2/1995 |
| JP | 07-078007 A | | 3/1995 |
| JP | 07-234708 A | | 9/1995 |
| JP | 2000-122706 A | | 4/2000 |
| JP | 2002-182709 A | | 6/2002 |
| JP | 2004-265001 A | | 9/2004 |
| JP | 2008-276545 A | | 11/2008 |
| JP | 2013-016021 A | | 1/2013 |
| JP | 2013-143096 A | | 7/2013 |

OTHER PUBLICATIONS

Communication dated Aug. 21, 2017, from State Intellectual Property Office of the P.R.C. in counterpart application No. 201480042337.7.
International Search Report for PCT/JP2014/068734 dated Sep. 30, 2014.
Communication dated Nov. 3, 2016, from the German Patent Office in counterpart German application No. 11 2014 003 085.6.

* cited by examiner

FIG.2

| AREA NAME | | ADDRESS | CONTENT | DATA ATTRIBUTE |
|---|---|---|---|---|
| INPUT DATA DESIGNATION AREA | | 0 | INPUT INFORMATION 1 | ADDRESS INFORMATION |
| | | 1 | INPUT INFORMATION 2 | ADDRESS INFORMATION |
| | | 2 | INPUT INFORMATION 3 | ADDRESS INFORMATION |
| | | 3 | INPUT INFORMATION 4 | ADDRESS INFORMATION |
| | | 4 | INPUT INFORMATION 5 | ADDRESS INFORMATION |
| CONSTANT DESIGNATION AREA | | 5 | CONSTANT 1(VALUE) | DIRECT VALUE |
| | | 6 | CONSTANT 1(DECIMAL POINT POSITION) | DIRECT VALUE |
| | | 7 | CONSTANT 2(VALUE) | DIRECT VALUE |
| | | 8 | CONSTANT 2(DECIMAL POINT POSITION) | DIRECT VALUE |
| | | 9 | CONSTANT 3(VALUE) | DIRECT VALUE |
| | | 10 | CONSTANT 3(DECIMAL POINT POSITION) | DIRECT VALUE |
| | | 11 | CONSTANT 4(VALUE) | DIRECT VALUE |
| | | 12 | CONSTANT 4(DECIMAL POINT POSITION) | DIRECT VALUE |
| | | 13 | CONSTANT 5(VALUE) | DIRECT VALUE |
| | | 14 | CONSTANT 5(DECIMAL POINT POSITION) | DIRECT VALUE |
| CALCULATION SEQUENCE AREA | 1 | 15 | FIRST TERM 1 | ADDRESS INFORMATION |
| | | 16 | OPERATOR 1 | OPERATOR CONSTANT (1 TO 4) |
| | | 17 | SECOND TERM 1 | ADDRESS INFORMATION |
| | 2 | 18 | FIRST TERM 2 | ADDRESS INFORMATION |
| | | 19 | OPERATOR 2 | OPERATOR CONSTANT (1 TO 4) |
| | | 20 | SECOND TERM 2 | ADDRESS INFORMATION |
| | 3 | 21 | FIRST TERM 3 | ADDRESS INFORMATION |
| | | 22 | OPERATOR 3 | OPERATOR CONSTANT (1 TO 4) |
| | | 23 | SECOND TERM 3 | ADDRESS INFORMATION |
| | 4 | 24 | FIRST TERM 4 | ADDRESS INFORMATION |
| | | 25 | OPERATOR 4 | OPERATOR CONSTANT (1 TO 4) |
| | | 26 | SECOND TERM 4 | ADDRESS INFORMATION |
| NUMBER-OF-TIMES-OF-CALCULATION STORAGE AREA | | 27 | NUMBER-OF-TIMES-OF-CALCULATION Sequence | DIRECT VALUE |
| CALCULATION-RESULT-DECIMAL-POINT-POSITION STORAGE AREA | | 28 | CALCULATION RESULT DECIMAL POINT POSITION | DIRECT VALUE |
| CALCULATION RESULT AREA | 1 | 29 / 30 | CALCULATION RESULT 1 | DIRECT VALUE |
| | 2 | 31 / 32 | CALCULATION RESULT 2 | DIRECT VALUE |
| | 3 | 33 / 34 | CALCULATION RESULT 3 | DIRECT VALUE |
| | 4 | 35 / 36 | CALCULATION RESULT 4 | DIRECT VALUE |
| | LAST | 37 / 38 | CALCULATION RESULT | DIRECT VALUE |

141 ARITHMETIC-EXPRESSION-DATA TABLE

FIG.4

DATA ATTRIBUTES OF ADDRESSES ARE DETERMINED IN ADVANCE ACCORDING TO MAXIMUM NUMBER OF TERMS OF ARITHMETIC EXPRESSION

CONTENTS OF ADDRESSES ARE ACQUIRED FROM INPUT DATA OF ARITHMETIC-EXPRESSION INPUT AREA 510

142 OPERATION-ATTRIBUTE-INFORMATION TABLE

| ADDRESS | DATA ATTRIBUTE | CONTENT |
|---|---|---|
| 0 | 1 | PARENTHESIS CONSTANT (0,1) |
| 1 | 1 | PARENTHESIS CONSTANT (0,1) |
| 2 | 1 | PARENTHESIS CONSTANT (0,1) |
| 3 | 4 | ADDRESS (0 TO 14) |
| 4 | 3 | OPERATOR CONSTANT (1 TO 4) |
| 5 | 1 | PARENTHESIS CONSTANT (0,1) |
| 6 | 1 | PARENTHESIS CONSTANT (0,1) |
| 7 | 1 | PARENTHESIS CONSTANT (0,1) |
| 8 | 4 | ADDRESS 0 TO 14 |
| 9 | 2 | PARENTHESIS CONSTANT (0,1) |
| 10 | 3 | OPERATOR CONSTANT (1 TO 4) |
| 11 | 1 | PARENTHESIS CONSTANT (0,1) |
| 12 | 1 | PARENTHESIS CONSTANT (0,1) |
| 13 | 4 | ADDRESS 0 TO 14 |
| 14 | 2 | PARENTHESIS CONSTANT (0,1) |
| 15 | 2 | PARENTHESIS CONSTANT (0,1) |
| 16 | 3 | OPERATOR CONSTANT (1 TO 4) |
| 17 | 1 | PARENTHESIS CONSTANT (0,1) |
| 18 | 4 | ADDRESS 0 TO 14 |
| 19 | 2 | PARENTHESIS CONSTANT (0,1) |
| 20 | 2 | PARENTHESIS CONSTANT (0,1) |
| 21 | 2 | PARENTHESIS CONSTANT (0,1) |
| 22 | 3 | OPERATOR CONSTANT (1 TO 4) |
| 23 | 4 | ADDRESS 0 TO 14 |
| 24 | 2 | PARENTHESIS CONSTANT (0,1) |
| 25 | 2 | PARENTHESIS CONSTANT (0,1) |
| 26 | 2 | PARENTHESIS CONSTANT (0,1) |
| 27 | | RIGHT END POINTER PR |

FIG.5

| DATA ATTRIBUTE | | |
|---|---|---|
| NUMERICAL VALUE DATA | REPRESENTED TERM | STORED VALUE |
| 1 | OPEN PARENTHESIS | 0: ABSENT 1: PRESENT |
| 2 | CLOSE PARENTHESIS | |
| 3 | OPERATOR | 1,2,3,4 |
| 4 | VALUE | 0 TO 14 |

FIG.6

| OPERATOR CONSTANT | |
|---|---|
| NUMERICAL VALUE DATA | REPRESENTED OPERATOR |
| 1 | × |
| 2 | ÷ |
| 3 | + |
| 4 | - |

FIG.15

| AREA NAME | | ADDRESS | CONTENT | DATA ATTRIBUTE |
|---|---|---|---|---|
| INPUT DATA DESIGNATION AREA | | 0 | ADDRESS 11 | ADDRESS INFORMATION |
| | | 1 | ADDRESS 12 | ADDRESS INFORMATION |
| | | 2 | 0 | ADDRESS INFORMATION |
| | | 3 | 0 | ADDRESS INFORMATION |
| | | 4 | 0 | ADDRESS INFORMATION |
| CONSTANT DESIGNATION AREA | | 5 | 30123 | DIRECT VALUE |
| | | 6 | 3 | DIRECT VALUE |
| | | 7 | 100 | DIRECT VALUE |
| | | 8 | 0 | DIRECT VALUE |
| | | 9 | 0 | DIRECT VALUE |
| | | 10 | 0 | DIRECT VALUE |
| | | 11 | 0 | DIRECT VALUE |
| | | 12 | 0 | DIRECT VALUE |
| | | 13 | 0 | DIRECT VALUE |
| | | 14 | 0 | DIRECT VALUE |
| CALCULATION SEQUENCE AREA | 1 | 15 | ADDRESS 5 | ADDRESS INFORMATION |
| | | 16 | 3 | OPERATOR CONSTANT (1 TO 4) |
| | | 17 | ADDRESS 1 | ADDRESS INFORMATION |
| | 2 | 18 | 0 | ADDRESS INFORMATION |
| | | 19 | 0 | OPERATOR CONSTANT (1 TO 4) |
| | | 20 | 0 | ADDRESS INFORMATION |
| | 3 | 21 | 0 | ADDRESS INFORMATION |
| | | 22 | 0 | OPERATOR CONSTANT (1 TO 4) |
| | | 23 | 0 | ADDRESS INFORMATION |
| | 4 | 24 | 0 | ADDRESS INFORMATION |
| | | 25 | 0 | OPERATOR CONSTANT (1 TO 4) |
| | | 26 | 0 | ADDRESS INFORMATION |
| NUMBER-OF-TIMES-OF-CALCULATION STORAGE AREA | | 27 | 0 | DIRECT VALUE |
| CALCULATION-RESULT-DECIMAL-POINT-POSITION STORAGE AREA | | 28 | 3 | DIRECT VALUE |
| CALCULATION RESULT AREA | 1 | 29 | 0 | DIRECT VALUE |
| | | 30 | | |
| | 2 | 31 | 0 | DIRECT VALUE |
| | | 32 | | |
| | 3 | 33 | 0 | DIRECT VALUE |
| | | 34 | | |
| | 4 | 35 | 0 | DIRECT VALUE |
| | | 36 | | |
| | LAST | 37 | 0 | DIRECT VALUE |
| | | 38 | | |

141 ARITHMETIC-EXPRESSION-DATA TABLE

FIG.16

| ADDRESS | DATA ATTRIBUTE | CONTENT |
|---|---|---|
| 0 | 1 | 0 |
| 1 | 1 | 0 |
| 2 | 1 | 0 |
| 3 | 4 | ADDRESS 0 |
| 4 | 3 | 1 |
| 5 | 1 | 1 |
| 6 | 1 | 1 |
| 7 | 1 | 0 |
| 8 | 4 | ADDRESS 29 |
| 9 | 2 | 0 |
| 10 | 3 | 0 |
| 11 | 1 | 0 |
| 12 | 1 | 0 |
| 13 | 4 | 0 |
| 14 | 2 | 1 |
| 15 | 2 | 0 |
| 16 | 3 | 2 |
| 17 | 1 | 0 |
| 18 | 4 | ADDRESS 7 |
| 19 | 2 | 1 |
| 20 | 2 | 0 |
| 21 | 2 | 0 |
| 22 | 3 | 0 |
| 23 | 4 | 0 |
| 24 | 2 | 0 |
| 25 | 2 | 0 |
| 26 | 2 | 0 |
| 27 |  | 19 |

142 OPERATION-ATTRIBUTE-INFORMATION TABLE

FIG.17

| AREA NAME | | ADDRESS | CONTENT | DATA ATTRIBUTE |
|---|---|---|---|---|
| INPUT DATA DESIGNATION AREA | | 0 | ADDRESS 11 | ADDRESS INFORMATION |
| | | 1 | ADDRESS 12 | ADDRESS INFORMATION |
| | | 2 | 0 | ADDRESS INFORMATION |
| | | 3 | 0 | ADDRESS INFORMATION |
| | | 4 | 0 | ADDRESS INFORMATION |
| CONSTANT DESIGNATION AREA | | 5 | 30123 | DIRECT VALUE |
| | | 6 | 3 | DIRECT VALUE |
| | | 7 | 100 | DIRECT VALUE |
| | | 8 | 0 | DIRECT VALUE |
| | | 9 | 0 | DIRECT VALUE |
| | | 10 | 0 | DIRECT VALUE |
| | | 11 | 0 | DIRECT VALUE |
| | | 12 | 0 | DIRECT VALUE |
| | | 13 | 0 | DIRECT VALUE |
| | | 14 | 0 | DIRECT VALUE |
| CALCULATION SEQUENCE AREA | 1 | 15 | ADDRESS 5 | ADDRESS INFORMATION |
| | | 16 | 3 | OPERATOR CONSTANT (1 TO 4) |
| | | 17 | ADDRESS 1 | ADDRESS INFORMATION |
| | 2 | 18 | ADDRESS 29 | ADDRESS INFORMATION |
| | | 19 | 2 | OPERATOR CONSTANT (1 TO 4) |
| | | 20 | ADDRESS 7 | ADDRESS INFORMATION |
| | 3 | 21 | 0 | ADDRESS INFORMATION |
| | | 22 | 0 | OPERATOR CONSTANT (1 TO 4) |
| | | 23 | 0 | ADDRESS INFORMATION |
| | 4 | 24 | 0 | ADDRESS INFORMATION |
| | | 25 | 0 | OPERATOR CONSTANT (1 TO 4) |
| | | 26 | 0 | ADDRESS INFORMATION |
| NUMBER-OF-TIMES-OF-CALCULATION STORAGE AREA | | 27 | 0 | DIRECT VALUE |
| CALCULATION-RESULT-DECIMAL-POINT-POSITION STORAGE AREA | | 28 | 3 | DIRECT VALUE |
| CALCULATION RESULT AREA | 1 | 29 | 0 | DIRECT VALUE |
| | | 30 | | |
| | 2 | 31 | 0 | DIRECT VALUE |
| | | 32 | | |
| | 3 | 33 | 0 | DIRECT VALUE |
| | | 34 | | |
| | 4 | 35 | 0 | DIRECT VALUE |
| | | 36 | | |
| | LAST | 37 | 0 | DIRECT VALUE |
| | | 38 | | |

141 ARITHMETIC-EXPRESSION-DATA TABLE

FIG.18

| ADDRESS | DATA ATTRIBUTE | CONTENT |
|---|---|---|
| 0 | 1 | 0 |
| 1 | 1 | 0 |
| 2 | 1 | 0 |
| 3 | 4 | ADDRESS 0 |
| 4 | 3 | 1 |
| 5 | 1 | 0 |
| 6 | 1 | 0 |
| 7 | 1 | 0 |
| 8 | 4 | ADDRESS 31 |
| 9 | 2 | 0 |
| 10 | 3 | 0 |
| 11 | 1 | 0 |
| 12 | 1 | 0 |
| 13 | 4 | 0 |
| 14 | 2 | 0 |
| 15 | 2 | 0 |
| 16 | 3 | 0 |
| 17 | 1 | 0 |
| 18 | 4 | 0 |
| 19 | 2 | 0 |
| 20 | 2 | 0 |
| 21 | 2 | 0 |
| 22 | 3 | 0 |
| 23 | 4 | 0 |
| 24 | 2 | 0 |
| 25 | 2 | 0 |
| 26 | 2 | 0 |
| 27 |  | 19 |

142 OPERATION-ATTRIBUTE-INFORMATION TABLE

FIG.19

| AREA NAME | | ADDRESS | CONTENT | DATA ATTRIBUTE |
|---|---|---|---|---|
| INPUT DATA DESIGNATION AREA | | 0 | ADDRESS 11 | ADDRESS INFORMATION |
| | | 1 | ADDRESS 12 | ADDRESS INFORMATION |
| | | 2 | 0 | ADDRESS INFORMATION |
| | | 3 | 0 | ADDRESS INFORMATION |
| | | 4 | 0 | ADDRESS INFORMATION |
| CONSTANT DESIGNATION AREA | | 5 | 30123 | DIRECT VALUE |
| | | 6 | 3 | DIRECT VALUE |
| | | 7 | 100 | DIRECT VALUE |
| | | 8 | 0 | DIRECT VALUE |
| | | 9 | 0 | DIRECT VALUE |
| | | 10 | 0 | DIRECT VALUE |
| | | 11 | 0 | DIRECT VALUE |
| | | 12 | 0 | DIRECT VALUE |
| | | 13 | 0 | DIRECT VALUE |
| | | 14 | 0 | DIRECT VALUE |
| CALCULATION SEQUENCE AREA | 1 | 15 | ADDRESS 5 | ADDRESS INFORMATION |
| | | 16 | 3 | OPERATOR CONSTANT (1 TO 4) |
| | | 17 | ADDRESS 1 | ADDRESS INFORMATION |
| | 2 | 18 | ADDRESS 29 | ADDRESS INFORMATION |
| | | 19 | 2 | OPERATOR CONSTANT (1 TO 4) |
| | | 20 | ADDRESS 7 | ADDRESS INFORMATION |
| | 3 | 21 | ADDRESS 0 | ADDRESS INFORMATION |
| | | 22 | 1 | OPERATOR CONSTANT (1 TO 4) |
| | | 23 | ADDRESS 31 | ADDRESS INFORMATION |
| | 4 | 24 | 0 | ADDRESS INFORMATION |
| | | 25 | 0 | OPERATOR CONSTANT (1 TO 4) |
| | | 26 | 0 | ADDRESS INFORMATION |
| NUMBER-OF-TIMES-OF-CALCULATION STORAGE AREA | | 27 | 0 | DIRECT VALUE |
| CALCULATION-RESULT-DECIMAL-POINT-POSITION STORAGE AREA | | 28 | 3 | DIRECT VALUE |
| CALCULATION RESULT AREA | 1 | 29 | 0 | DIRECT VALUE |
| | | 30 | | |
| | 2 | 31 | 0 | DIRECT VALUE |
| | | 32 | | |
| | 3 | 33 | 0 | DIRECT VALUE |
| | | 34 | | |
| | 4 | 35 | 0 | DIRECT VALUE |
| | | 36 | | |
| | LAST | 37 | 0 | DIRECT VALUE |
| | | 38 | | |

141 ARITHMETIC-EXPRESSION-DATA TABLE

FIG.20

| ADDRESS | DATA ATTRIBUTE | CONTENT |
|---|---|---|
| 0 | 1 | 0 |
| 1 | 1 | 0 |
| 2 | 1 | 0 |
| 3 | 4 | 0 |
| 4 | 3 | 0 |
| 5 | 1 | 0 |
| 6 | 1 | 0 |
| 7 | 1 | 0 |
| 8 | 4 | 0 |
| 9 | 2 | 0 |
| 10 | 3 | 0 |
| 11 | 1 | 0 |
| 12 | 1 | 0 |
| 13 | 4 | 0 |
| 14 | 2 | 0 |
| 15 | 2 | 0 |
| 16 | 3 | 0 |
| 17 | 1 | 0 |
| 18 | 4 | 0 |
| 19 | 2 | 0 |
| 20 | 2 | 0 |
| 21 | 2 | 0 |
| 22 | 3 | 0 |
| 23 | 4 | 0 |
| 24 | 2 | 0 |
| 25 | 2 | 0 |
| 26 | 2 | 0 |
| 27 |  | 19 |

142 OPERATION-ATTRIBUTE-INFORMATION TABLE

PLC SYSTEM AND ARITHMETIC-EXPRESSION-DATA-CREATION SUPPORTING APPARATUS

CROSS REFERENCE TO RELATED APPLICATIONS

This application is a National Stage of International Application No. PCT/JP2014/068734 filed Jul. 14, 2014, the contents of all of which are incorporated herein by reference in their entirety.

FIELD

The present invention relates to, for example, a PLC system including a PLC unit and a shared memory and an arithmetic-expression-data-creation supporting apparatus.

BACKGROUND

In a sequencer unit that is a PLC unit constituting a programmable logic controller (PLC), a conventional technique has not provided a method of calculating any arithmetic expression created by a user in the inside of the unit. When causing the PLC to implement an arithmetic operation, the user adopts a method of combining ladder commands to create a ladder program in advance such that the arithmetic operation is implemented according to calculation sequence of a desired arithmetic expression and implementing the arithmetic operation within a sequencer CPU (Central Processing Unit). Therefore, to implement a complicated arithmetic operation, it is necessary to create a ladder program corresponding to the arithmetic operation.

As measures against such a problem, there has been proposed a technique that can execute an arithmetic operation within an apparatus by converting an arithmetic expression formed by a combination of parentheses and operators and calculation sequence of the arithmetic expression into ladder commands and registering the ladder commands in the apparatus including a sequence control function in advance (see, for example, Patent Literature 1).

As a function of causing the PLC to implement the arithmetic operation inside the unit, there is an analog input/output unit installed with a simplified "loop control function" for applying, according to an arithmetic expression set in advance, an arithmetic operation to a digital value obtained from an analog value inputted to an analog input channel and performing analog output (see, for example, Patent Literature 2).

CITATION LIST

Patent Literature

Patent Literature 1: Japanese Patent Application Laid-Open No. 2013-143096
Patent Literature 2: Japanese Patent Application Laid-Open No. H7-78007

SUMMARY

Technical Problem

According to Patent Literature 1, it is possible to cause the PLC to implement any arithmetic expression created by the user. However, in such a conventional technique, because the arithmetic operation is implemented via the ladder program, there is a problem in that it takes a lot of time and effort to create the ladder program. Execution speed of the ladder program depends on a control cycle of a CPU device that controls the ladder program, that is, a scan time. The scan time is longer as a size of the ladder program is larger. Thus, there is a problem in that a high-speed arithmetic operation is difficult.

In Patent Literature 2, because the arithmetic expression is limited to an arithmetic expression of a fixed pattern prepared by the unit, there is a problem in that the user cannot freely change an operation method of the unit. Therefore, there has been an unchanged demand for a PLC system and an arithmetic-expression-data-creation supporting apparatus that can easily create any polynomial arithmetic expression without requiring a complicated ladder program and realizes, inside a unit, a free and advanced arithmetic operation desired by a user.

The present invention has been devised in view of the above-mentioned circumstances, and its object is to provide a PLC system and an arithmetic-expression-data-creation supporting apparatus that make an operation program on a sequencer CPU unnecessary, enable reduction in man-hours for creating a ladder program, and can perform an advanced arithmetic operation not depending on a scan time of the sequencer CPU.

Solution to Problem

In order to solve the above-mentioned problems and achieve the object, the present invention provides a PLC system comprising: a programmable logic controller including a PLC unit and a storing unit; and an arithmetic-expression-data-creation supporting apparatus that causes the PLC unit to create arithmetic expression data of an arithmetic expression to be executed by the PLC unit, wherein the arithmetic-expression-data-creation supporting apparatus includes: an input unit to receive, from a user, the arithmetic expression including input information serving as a variable used in an arithmetic operation and a constant used in the arithmetic operation; and an arithmetic-expression processing unit to obtain a calculation sequence of the arithmetic expression, the storing unit retains an arithmetic-expression-data table for managing the arithmetic expression data including the input information, the constant and the calculation sequence, and the PLC unit includes an operation unit that is connected to the storing unit, to execute an arithmetic operation of the arithmetic expression according to the calculation sequence using the input information and the constant.

Advantageous Effects of Invention

The PLC system according to the present invention has an advantageous effect that an operation program on a sequencer CPU is made unnecessary, a reduction in man-hours for creating a ladder program is possible, and it is possible to perform an advanced arithmetic operation not depending on a scan time of the sequencer CPU.

BRIEF DESCRIPTION OF DRAWINGS

FIG. 2 is a diagram for explaining the data structure of arithmetic expression data stored in an arithmetic-expression-data table in the embodiment of the present invention.

FIG. 4 is a diagram for explaining an example of an operation-attribute-information table according to the embodiment of the present invention.

FIG. 5 is a diagram showing types of data attributes in the operation-attribute-information table according to the embodiment of the present invention.

FIG. 6 is a diagram for explaining operator constants according to the embodiment of the present invention.

FIG. 15 is a diagram for explaining processing for transferring, to the arithmetic-expression-data table in a shared memory, the example of the arithmetic expression created in the arithmetic-expression-data creation tool in the embodiment of the present invention.

FIG. 16 is a diagram for explaining a state of the operation-attribute-information table in the case of FIG. 15.

FIG. 17 is a diagram for explaining processing for transferring, to the arithmetic-expression-data table in the shared memory, the example of the arithmetic expression created in the arithmetic-expression-data creation tool in the embodiment of the present invention.

FIG. 18 is a diagram for explaining a state of the operation-attribute-information table in the case of FIG. 17.

FIG. 19 is a diagram for explaining a state at the time when the transfer of the example of the arithmetic expression created in the arithmetic-expression-data creation tool in the embodiment of the present invention to the arithmetic-expression-data table in the shared memory is completed.

FIG. 20 is a diagram for explaining a state of the operation-attribute-information table in the case of FIG. 19.

DESCRIPTION OF EMBODIMENTS

Now the description is provided for an embodiment of a PLC system and an arithmetic-expression-data-creation supporting apparatus according to the present invention in detail with reference to the drawings. Note that the present invention is not limited by the embodiment.

Embodiment

Figure 1:
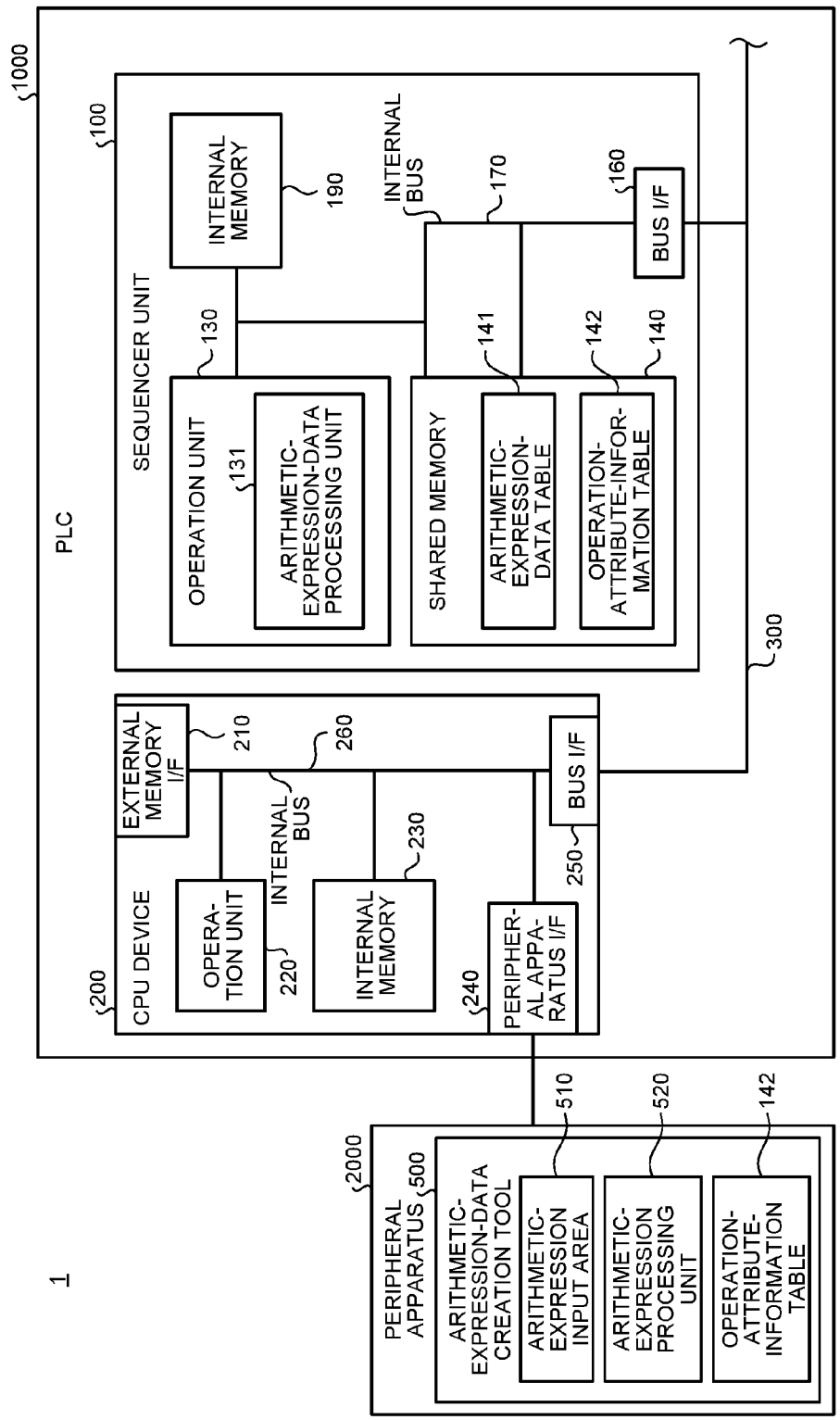
FIG. 1 is a block diagram for explaining the configuration of a PLC system including a sequencer unit in an embodiment of the present invention.

FIG. 1 is a block diagram for explaining the configuration of a PLC system 1 including a sequencer unit 100 that is a PLC unit in an embodiment of the present invention. As shown in FIG. 1, the sequencer unit 100 is connected to a CPU device 200 via an inter-unit bus 300. The sequencer unit 100 and the CPU device 200 that is a CPU unit constitute a part of a PLC 1000 that is a programmable logic controller. For example, the sequencer unit 100 corresponds to an A/D conversion unit that captures, from the outside, an analog signal from a sensor or the like and converts an analog value into a digital value, or a counter unit that counts an input pulse. However, no limitation is set for a type of the sequencer unit 100 according to this embodiment. The sequencer unit 100 includes an operation unit 130 including an arithmetic-expression-data processing unit 131, an internal memory 190 connected to the operation unit 130, a shared memory 140, and a bus I/F (interface) 160 that is an interface with the inter-unit bus 300. The shared memory 140 is a storing unit accessible from both of the operation unit 130 and the CPU device 200.

The CPU device 200 includes an external memory I/F 210 that is an interface for accessing an external memory that stores a user program, data necessary for execution of the user program, and data of an execution result of the user program, an operation unit 220 that executes the user program and executes control of the entire CPU device 200, an internal memory 230 that is a memory for storing the data necessary for the execution of the user program and input and output values of the user program, a peripheral apparatus I/F 240 that is an interface for connecting a peripheral apparatus 2000 for displaying setting of the user program and a state of data of the internal memory 230, and a bus I/F 250 that is a communication interface for performing communication with the sequencer unit 100 via the inter-unit bus 300.

The external memory I/F 210, the operation unit 220, the internal memory 230, the peripheral apparatus I/F 240, and the bus I/F 250 are connected to one another by an internal bus 260. Note that a system including the PLC 1000 and the peripheral apparatus 2000 that corresponds to a personal computer or the like connected to the PLC 1000 is referred to as PLC system 1.

The peripheral apparatus 2000 includes an arithmetic-expression-data creation tool 500 that supports user's creation of an arithmetic expression and thereby enables registration of the arithmetic expression. That is, the peripheral apparatus 2000 functions as an arithmetic-expression-data-creation supporting apparatus. The arithmetic-expression-data creation tool 500 is realized by executing a software on the peripheral apparatus 2000. Further, the arithmetic-expression-data creation tool 500 includes an arithmetic-expression input area 510 for freely inputting combinations of any of input information for the sequencer unit 100 serving as constants and variables, "( ): parentheses", and operators and enabling creation of a polynomial arithmetic expression, and an arithmetic-expression processing unit 520 for registering the created arithmetic expression in the sequencer unit 100. Note that registering the created arithmetic expression in the sequencer unit 100 specifically means creating, in the shared memory 140, an arithmetic-expression-data table 141 having information concerning an arithmetic expression including the-above-mentioned input information, constants and more.

Note that, in the following explanation, to clarify the explanation, names of a storage region, a data attribute, an operator constant, a variable, and the like are sometimes indicated by being sandwiched by quotation marks.

For example, in the A/D conversion unit, a digital value obtained by converting an analog signal from a sensor or the like corresponds to the input information for the sequencer unit 100. In the counter unit, a counted input pulse corresponds to the input information for the sequencer unit 100. However, the input information is not particularly limited as long as the input information is information expanded in the shared memory 140. Then, all kinds of information inputted to the sequencer unit 100 can be freely used as an operation target.

The shared memory 140 in the sequencer unit 100 is now explained. In the embodiment of the present invention, the arithmetic-expression-data table 141 is secured in the shared memory 140, from which the operation unit 130 of the sequencer unit 100 can perform readout at high speed, and an arithmetic expression created and registered by the user in the arithmetic-expression-data creation tool 500 is passed to the sequencer unit 100 via this table.

FIG. 2 is a diagram for explaining the data structure of the arithmetic-expression-data table 141 for an arithmetic expression including five terms at most. When an arithmetic expression including a plurality of terms is calculated, there is a rule that priority of calculation is determined according to presence or absence of parentheses and priority of operators and a binomial having high priority is calculated first. Therefore, when the arithmetic expression is expanded in the arithmetic-expression-data table 141, the arithmetic expression is resolved into a plurality of binomials and the binomials are stored in the arithmetic-expression-data table 141 in the sequence of calculation to be performed by the sequencer unit 100. On this occasion, in the arithmetic-expression-data table 141, the resolved binomials are divided into a "first term", an "operator", and a "second term" and stored in the order of a "calculation sequence area 1" to a "calculation sequence area 4" for a "calculation sequence 1" to a "calculation sequence 4". Further, the number of binomials to be finally calculated is counted and stored in a "number-of-times-of-calculation Sequence".

Results obtained by the calculations for the calculation sequences are stored in order in a "calculation result area" of the arithmetic-expression-data table 141. Note that the sequences and the results are thereafter stored in association with each other in such a manner that a result obtained by the calculation in the "calculation sequence area 1" is a "calculation result 1". An arithmetic operation of a polynomial optionally created by the user can be realized by calculating, in order, binomials of the calculation sequence areas for the number indicated by the "number-of-times-of-calculation Sequence".

For example, when calculation of "(3×(4−2))" is performed, an overall calculation result "6" is obtained by binomial operations for two times in total, which "2" is subtracted from "4" first and subsequently "2" as the subtraction result is multiplied by "3". Therefore, in the embodiment of the present invention, an arithmetic expression of "4-2" to be calculated first is stored in "the calculation sequence area 1" as the "calculation sequence 1", and then the calculation result "2" is stored in the "calculation result 1". Further, "3×'calculation result 1'", which is a multiplication expression of the "calculation result 1" and "3" to be calculated second is stored in the "calculation sequence 2". The number of times of calculation of the binomials "2" is stored in the "number-of-times-of-calculation Sequence". By performing calculations for the number of times of calculation "2" in order from the "calculation sequence 1", it is possible to obtain an overall calculation result.

As explained above, in the arithmetic-expression-data table 141, not only an "input data designation area", which is a region where address information at which input information serving as variables that are data used by the operation unit 130 for an arithmetic operation, among input information for the sequencer unit 100 is stored, but also the following areas are secured: a "constant designation area", which is a region where constants that are data used by the operation unit 130 for an arithmetic operation, are stored; a "calculation sequence area", which is a region where a binomial to be calculated in each calculation sequence is stored; a "number-of-times-of-calculation storage area", which is a region where the "number-of-times-of-calculation Sequence" that is the calculation number of times of binomials is stored; a "calculation-result-decimal-point-position storage area", which is a region for designating a "calculation result decimal point position" that is a decimal point position of a calculation result; and a "calculation result area", which is a region where calculation results of the binomials in the calculation sequences and a calculation result of a registered arithmetic expression are stored. The arithmetic-expression-data table 141 manages information of these areas. Note that, the data structure of the arithmetic-expression-data table 141 shown in FIG. 2 presents, as one example, a table of an arithmetic expression including five terms, but the number of terms is not limited in this embodiment.

Referring back to FIG. 1, the sequencer unit 100 includes, not only the above-mentioned memory 140, but also the operation unit 130 that executes control of the entire sequencer unit 100 and the bus I/F 160, which is a communication interface for performing communication with the CPU device 200 via the inter-unit bus 300. The operation unit 130, the shared memory 140, and the bus I/F 160 are connected to one another by an internal bus 170.

The operation unit 130 includes an arithmetic-expression-data processing unit 131 that implements an arithmetic operation according to arithmetic expression data expanded in the arithmetic-expression-data table 141. The operation unit 130 is subjected to the execution for each internal control cycle of the sequencer unit 100, so that a high-speed and fixed-cycle arithmetic operation is guaranteed.

Next, description is given for the operation of the PLC system 1 according to the embodiment of the present invention.

Figure 3:
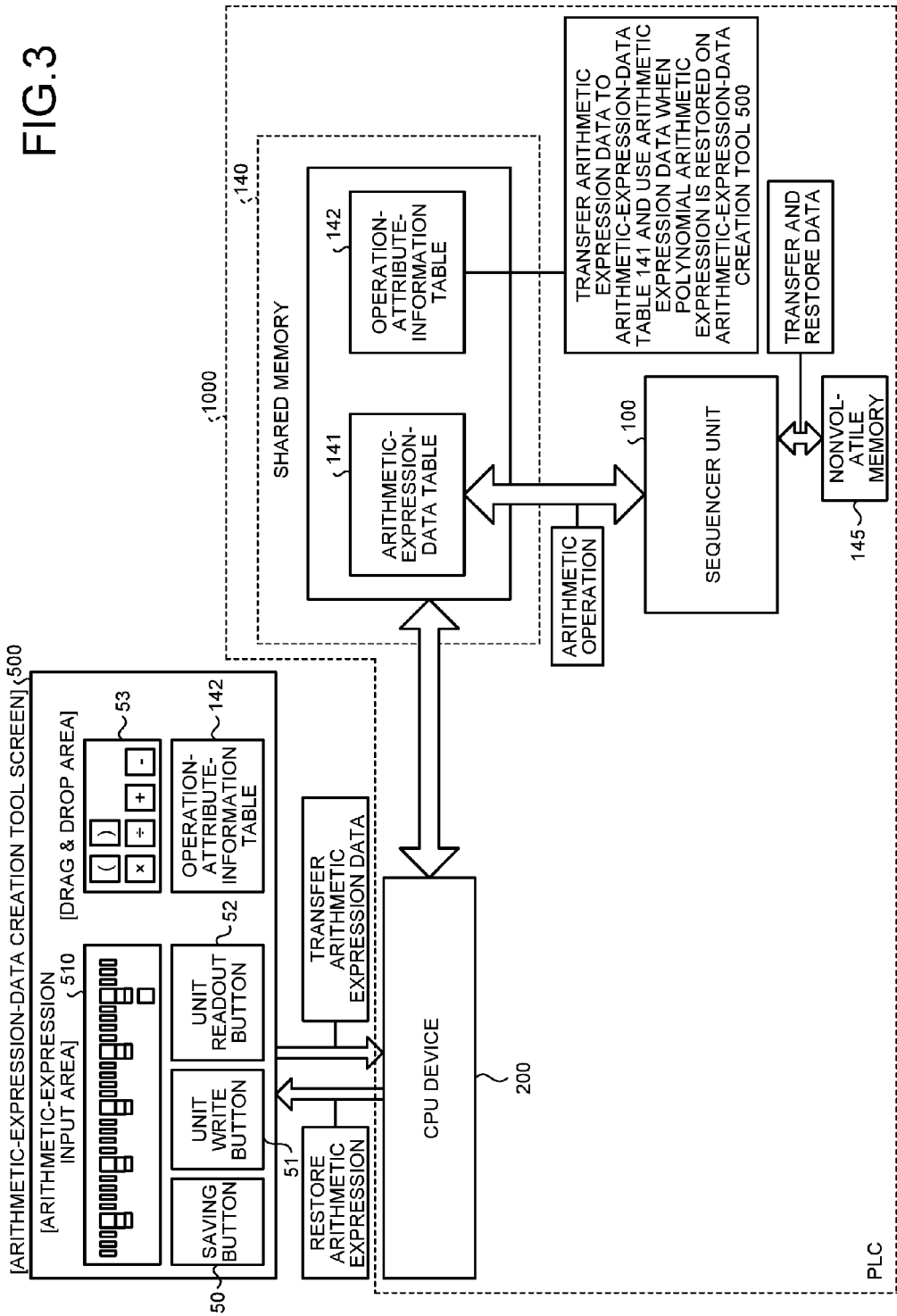
FIG. 3 is a diagram for explaining, together with a flow of the arithmetic expression data, an overview of the PLC system according to the embodiment of the present invention.

FIG. 3 is a diagram for explaining, together with a flow of arithmetic expression data, the overview of the PLC system 1 according to the embodiment of the present invention. Herein, the shared memory 140 is provided in the inside of the PLC 1000 but on the outside of the sequencer unit 100. In this way, as long as the shared memory 140 is accessible from both of the operation unit 130 of the sequencer unit 100 and the CPU device 200, the shared memory 140 does not always need to be present in the inside of the sequencer unit 100 as shown in FIG. 1.

First, the user creates a desired arithmetic expression in the arithmetic-expression input area 510 provided on a screen of the arithmetic-expression-data creation tool 500 equipped with an input unit such as a keyboard, a touch panel or the like. After creating the arithmetic expression, the user presses a unit write button 51 provided on the screen. When the unit write button 51 is pressed, first, the arithmetic-expression-data creation tool 500 searches through the arithmetic-expression input area 510 and creates an operation-attribute-information table 142. The operation-attribute-information table 142 is provided in, for example, storage means within the arithmetic-expression-data creation tool 500. However, the operation-attribute-information table 142 may be provided in the shared memory 140 as explained later.

The operation-attribute-information table 142 is a table that stores arithmetic expression data inputted in the arithmetic-expression input area 510, and has two kinds of information, i.e., a "data attribute" and a "content" of elements constituting an arithmetic expression. FIG. 4 is a diagram for explaining an example of the operation-attribute-information table 142 in which arithmetic expression data consisting of five terms at most are stored. FIG. 5 is a diagram showing types of data attributes in the operation-attribute-information table according to the embodiment of the present invention. FIG. 6 is a diagram for explaining operator constants according to the embodiment of the present invention.

A "data attribute" in FIG. 4 is an area for storing an attribute indicating to which each element of arithmetic expression data belongs among "address information" for referring to an address in the shared memory 140, a "direct value" representing a constant or a decimal point position, a "parenthesis constant" representing parentheses, and an "operator constant" representing an operator. In the "data attribute" of FIG. 4, as shown in FIG. 5, as "1: open parenthesis", "2: close parenthesis", "3: operator", or "4: value", any one of 1 to 4 that "numerical value data" of them is stored. Attributes of the "address information" and the "direct value" are "4: value". An attribute of the "parenthesis constant" is "1: open parenthesis" or "2: close parenthesis". An attribute of the "operator constant" is "3: operator".

These "data attributes" are data that are established in advance at the stage where the number of terms of a polynomial arithmetic expression is determined, that is, the stage where the number of terms is displayed on a screen and that do not depend on an input from the user. On the other hand, the "content" shown in FIG. 4 is an area where an arithmetic expression created by the user in the arithmetic-expression input area 510 is stored according to elements thereof. Values stored in the "content" are different depending on the "data attribute" corresponding to each "address" in FIG. 4. When the "data attribute" is "1: open parenthesis" or "2: close parenthesis", 0 or 1, which is a "stored value" corresponding to "present: 1" or "absent: 0" shown in FIG. 5 is stored in the "content" as a parenthesis constant. When the "data attribute" is "3: operator", a numerical value of any one of 1 to 4 that are "numerical value data" corresponding to "x: 1", "÷: 2", "+: 3", and "−: 4", association of which is shown in FIG. 6, is stored in the "content" as an operator constant. When the "data attribute" is "4: value", addresses 0 to 14, which include "addresses" 0 to 4 corresponding to an "input data designation area" and "addresses" 5 to 14 corresponding to a "constant designation area" in the arithmetic-expression-data table 141 in FIG. 2 are stored in the "content".

Referring back to FIG. 3, the CPU device 200 searches through the operation-attribute-information table 142, resolves the arithmetic expression into binomials on the basis of the data attribute, and transfers the binomials to the arithmetic-expression-data table 141 and writes them therein.

According to the procedure explained above, the arithmetic expression data created by the arithmetic-expression-data creation tool 500 is transferred to the arithmetic-expression-data table 141. The sequencer unit 100 performs an arithmetic operation by reading out the arithmetic expression data transferred to the arithmetic-expression-data table 141.

Note that the arithmetic-expression-data creation tool 500 may include a saving button 50 besides the unit write button 51 explained above. In this case, project data for the arithmetic-expression-data creation tool 500 can be saved in the peripheral apparatus 2000, so that reuse or the like of an arithmetic expression can be easily realized.

Note that, although unnecessary for an arithmetic operation, the operation-attribute-information table 142 may be secured in the shared memory 140. In this case, even in the peripheral apparatus 2000 in which project data of the arithmetic-expression-data creation tool 500 is absent, by virtue of the fact that the readout button 52 is provided on the arithmetic-expression-data creation tool 500, it is possible to restore a polynomial arithmetic expression on the arithmetic-expression-data creation tool 500 by reading out the arithmetic-expression-data table 141 and the operation-attribute-information table 142.

Figure 7:
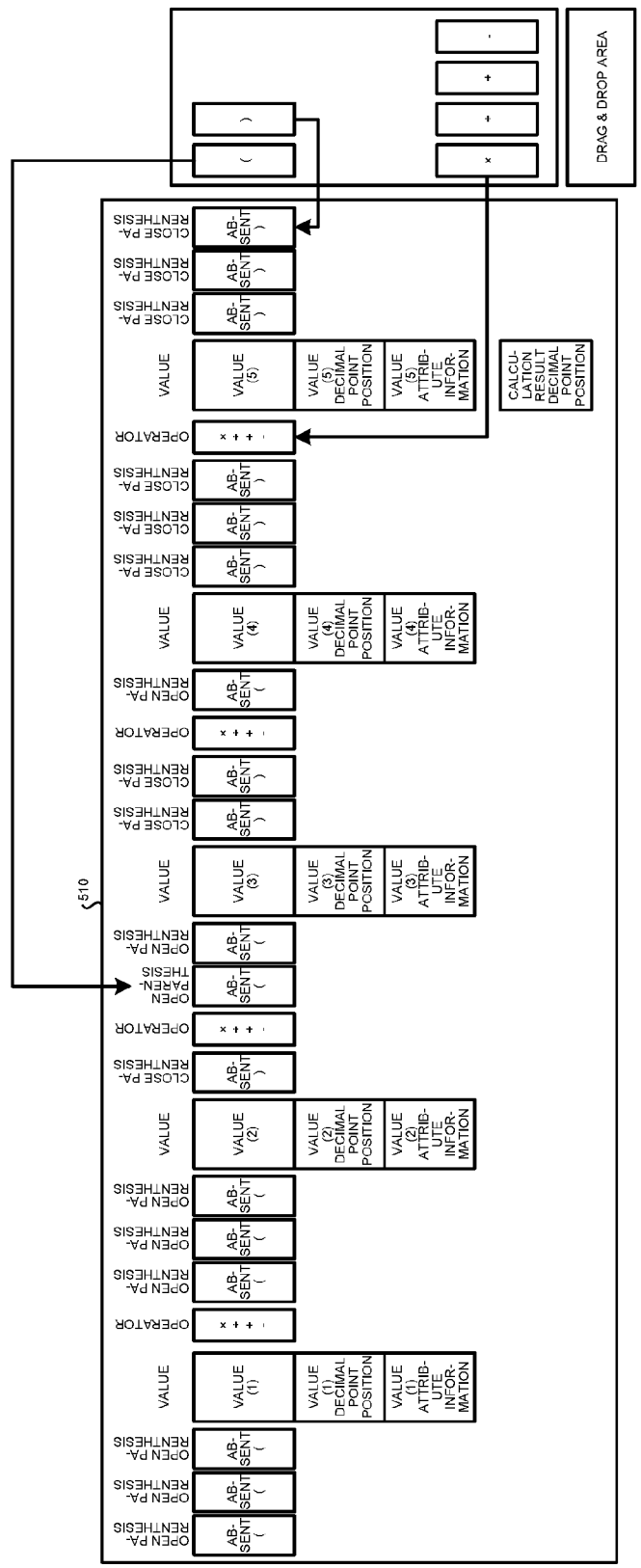
FIG. 7 is a diagram for explaining an arithmetic-expression input area that is a display screen of an arithmetic-expression-data creation tool in the embodiment of the present invention.

Now, a creation procedure for an arithmetic expression using the arithmetic-expression input area 510 is explained. FIG. 7 is a diagram for explaining the arithmetic-expression input area 510, which is a display screen of the arithmetic-expression-data creation tool 500 according to the embodiment of the present invention. In the "open parenthesis" and the "close parenthesis", selection is made for whether or not "( ) parentheses" is set in their respective positions. In the "operator", any one of arithmetic operators (+, −, ×, and ÷) is selected. Note that "(: open parenthesis", "): close parenthesis", and operators can be inputted with simple operation based on a drag & drop area 53 shown in FIG. 3 or pull-down.

In "VALUE(1)" to "VALUE(5)" in FIG. 7, when input information to the sequencer unit 100 is used, addresses on the shared memory 140 in which information used for an arithmetic operation is stored, are inputted, but when a constant is used, any numerical values are inputted. Further, when information inputted to the "VALUE(1)" to "VALUE(5)" are constants, the number of digits of a numerical value after the decimal point is inputted to "VALUE(1) decimal point position" to "VALUE(5) decimal point position". Information on whether information inputted to the "VALUE(1)" to the "VALUE(5)" is "input information" or "constant" is inputted to "VALUE(1) attribute information" to "VALUE(5) attribute information". Note that the tool that can create an arithmetic expression including five terms at most is shown as an example in FIG. 7, but the number of terms of the arithmetic expression is not limited in this embodiment.

After the arithmetic expression is created in the arithmetic-expression input area 510, a numerical value is inputted to the "calculation result decimal point position". The "calculation result decimal point position" is used in discriminating how many digits after the decimal point a calculation result is displayed with when the calculation result is monitored on the peripheral apparatus 2000. After performing inputting in the above-mentioned manner, the unit write button 51 shown in FIG. 3 is pressed down. When the unit write button 51 is manipulated, the arithmetic-expression processing unit 520 performs registration processing of the arithmetic expression.

Next, the registration processing for the arithmetic expression is explained. Among the arithmetic expression data, the "VALUE(1) decimal point position" to the "VALUE(5) decimal point position", the "VALUE(1) attribute information" to the "VALUE(5) attribute information", and the "calculation result decimal point position" are stored in the arithmetic-expression-data table 141. On the other hand, processing is executed to store the input information to the sequencer unit 100, the constants, the operators, and the "(: open parenthesis", and the "): closed parenthesis)" in the operation-attribute-information table 142, thereafter resolve the arithmetic expression into binomials in the arithmetic-expression processing unit 520, and store the binomials in the arithmetic-expression-data table 141 in accordance with the calculation sequence thereof.

Figure 8:
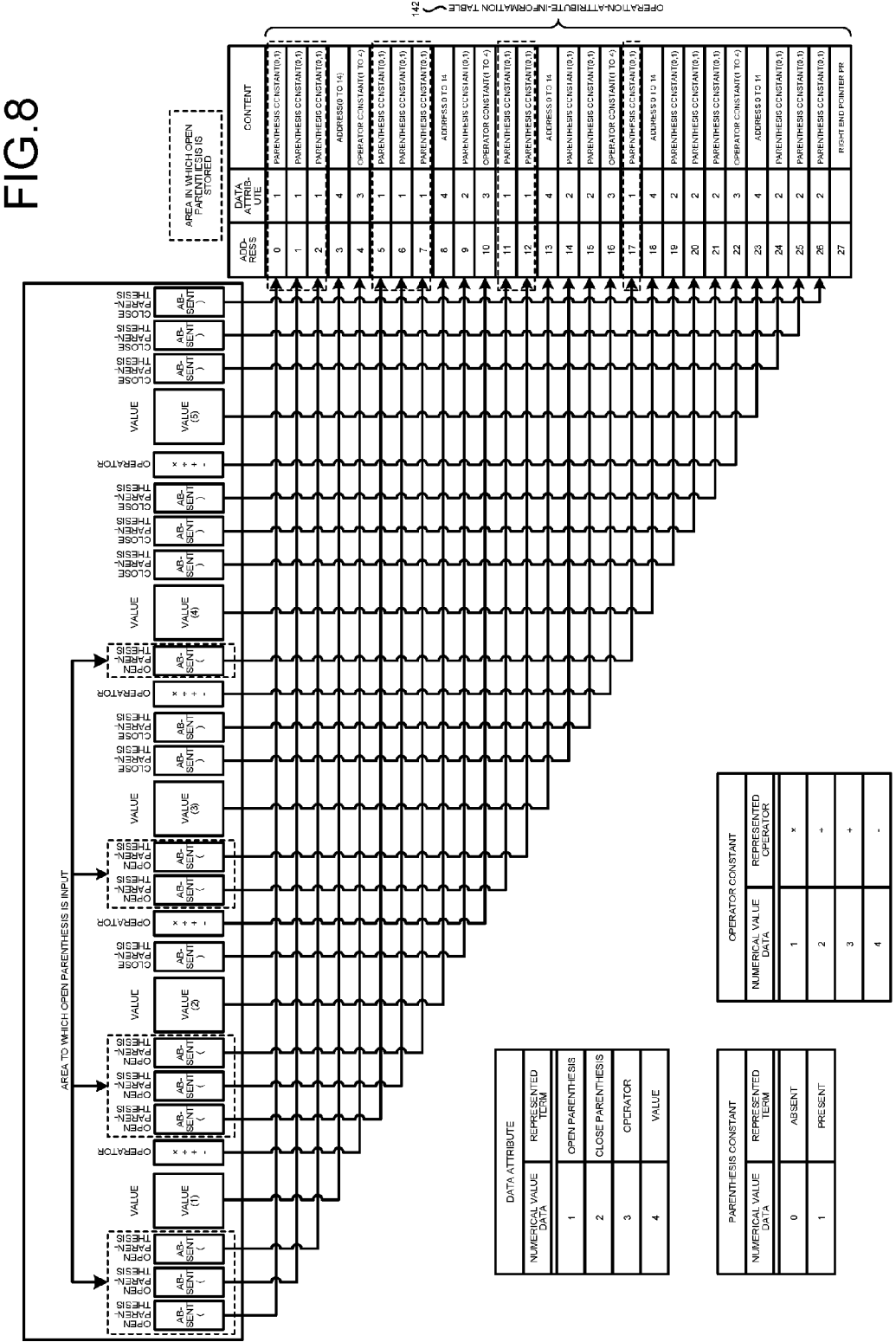
FIG. 8 is a diagram for explaining processing for storing, in the operation-attribute-information table, arithmetic expression data created in the arithmetic-expression input area of the arithmetic-expression-data creation tool in the embodiment of the present invention.

First, a procedure for storing the arithmetic expression data in the operation-attribute-information table 142 is explained. FIG. 8 is a diagram for explaining processing for storing, in the operation-attribute-information table 142, the arithmetic expression data created in the arithmetic-expression input area 510 in the embodiment of the present invention. As shown in FIG. 8, the constants of the arithmetic expression data, the input information to the sequencer unit 100, the operators, "(: open parenthesis", and "): close parenthesis" are converted into their eigen numerical values, respectively, and thereafter stored in the operation-attribute-information table 142. Among them, concerning the input information to the sequencer unit 100 and the constants, addresses in which the input information or the constants are stored in the arithmetic-expression-data table 141 are stored. The operators are converted into operator constants "(×: 1", "÷: 2", "+: 3", and "−: 4", which are operator constants in their respective arithmetic operators. The "(: open parenthesis" and the "): close parenthesis" are converted into "present: 1" or "absent: 0", which are parenthesis constants, in their respective positions.

The arithmetic expression data having been converted into the numerical values are stored in the operation-attribute-information table 142 included in the arithmetic-expression processing unit 520. At this point, concerning an item with no input or with blank on a tool, a fixed numerical value 0 is stored to indicate that the item are blank. A "right end pointer PR" is provided in the last of the operation-attribute-information table 142. The arithmetic-expression-data creation tool 500 searches for the last data in the arithmetic-expression input area 510 and stores an address corresponding to the last data in the operation-attribute-information table 142 as the "right end pointer PR".

When the arithmetic expression data having been converted into the numerical values are stored in the operation-attribute-information table 142, the arithmetic expression data are stored in the operation-attribute-information table 142 in order from the left of the arithmetic expression. As shown in FIG. 8, which element of the arithmetic expression is inputted to the arithmetic-expression input area 510 is determined depending on the number of terms. Therefore, which of the parenthesis, the value, and the operator is stored in each address of the operation-attribute-information table 142 is determined depending on the number of terms of the expression in advance. For example, because the positions of the open parentheses correspond to the open parenthesis areas shown in FIG. 8, areas where the open parentheses of the operation-attribute-information table 142 are stored are in addresses 0 to 2, 5 to 7, 11, 12, and 17. Therefore, numerical values are stored for the data attributes of the operation-attribute-information table 142 in advance at the point when a screen is opened on the arithmetic-expression-data creation tool 500. The arithmetic-expression processing unit 520 searches through the table on the basis of the data attributes stored in the operation-attribute-information table 142 and determines binomial calculation order.

Figure 9:
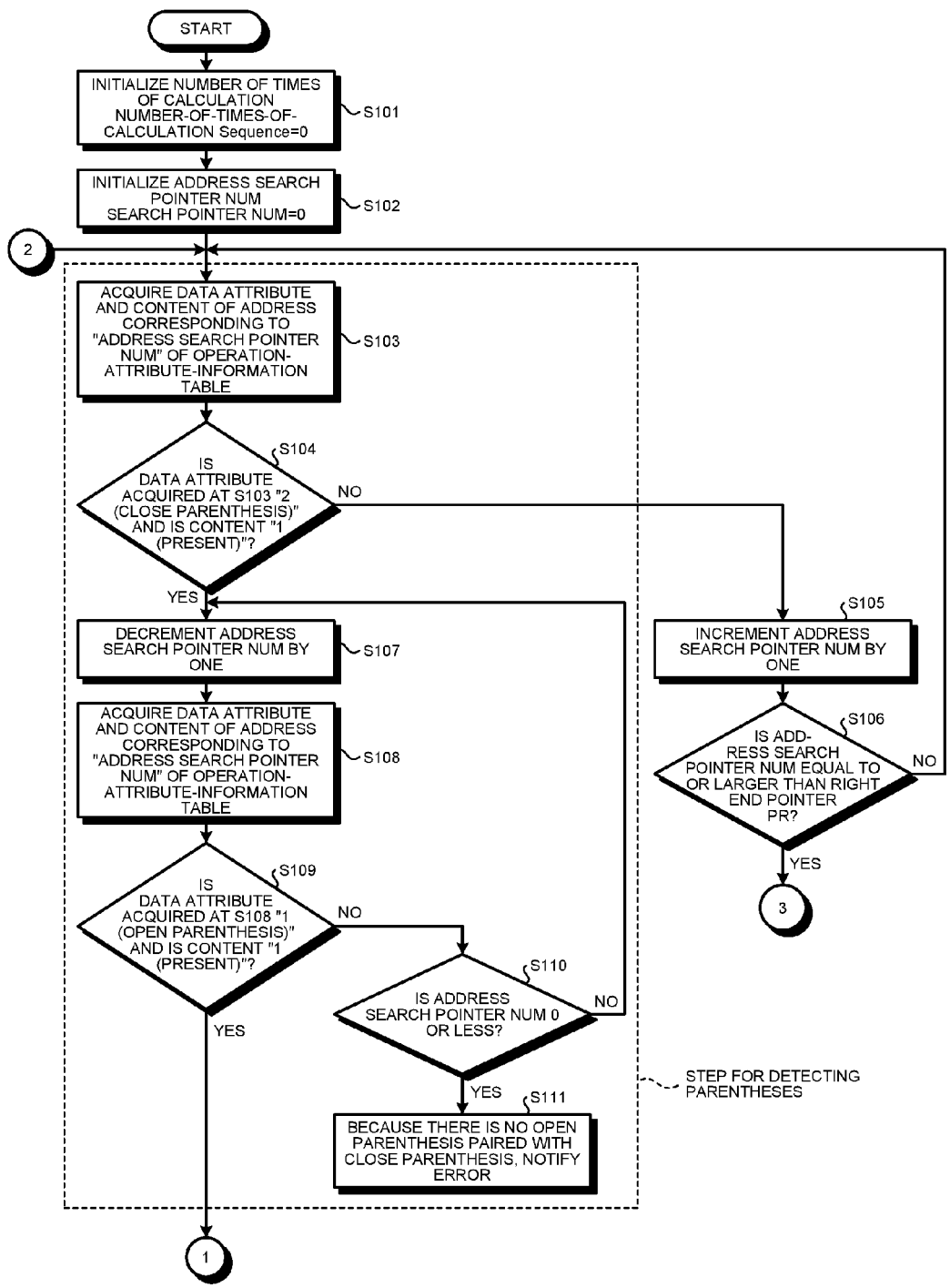
FIG. 9 is a chart for explaining an example of a processing flow of an arithmetic-expression processing unit of the arithmetic-expression-data creation tool in the embodiment of the present invention.
Figure 10:
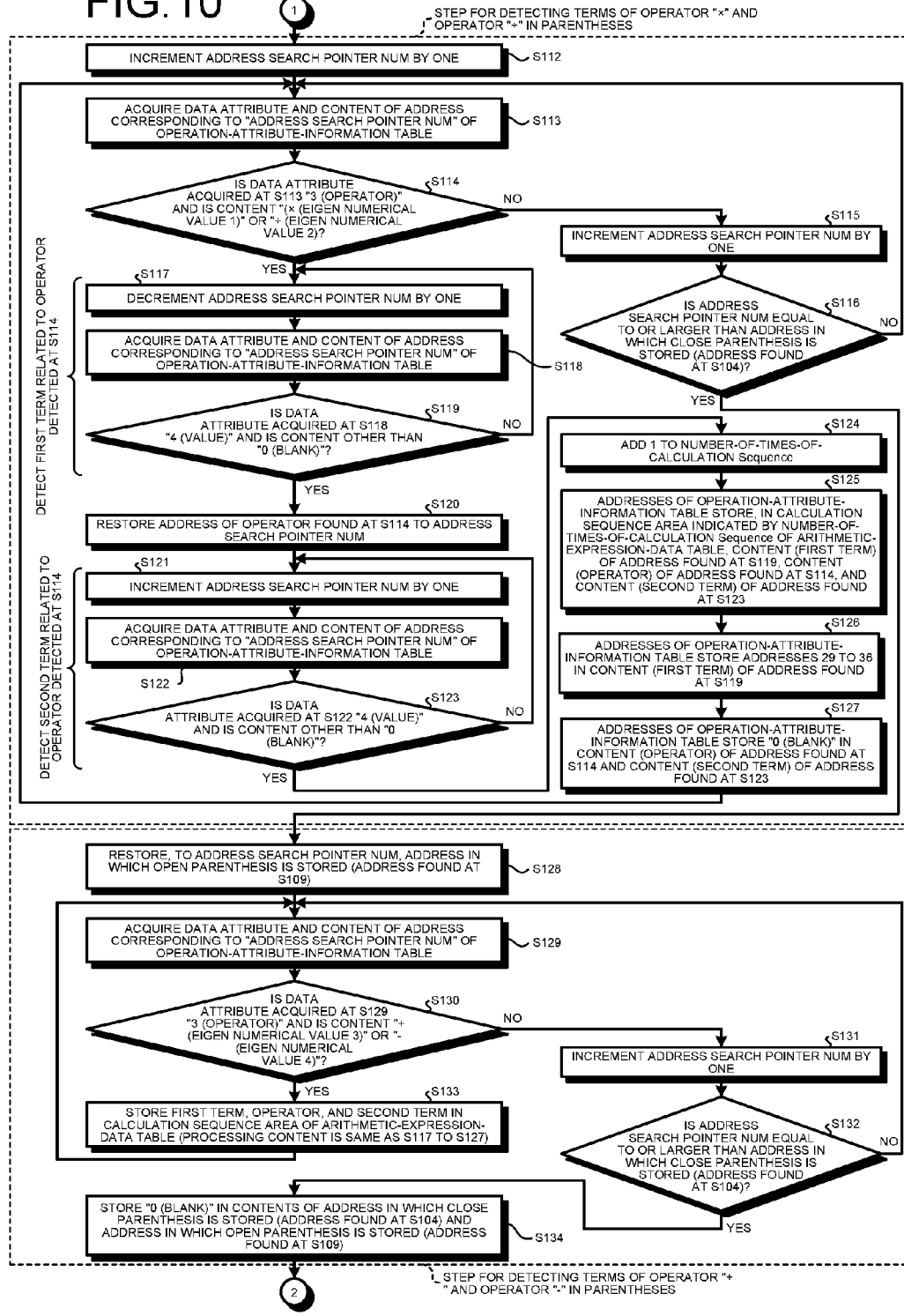
FIG. 10 is a chart for explaining the example of the processing flow of the arithmetic-expression processing unit of the arithmetic-expression-data creation tool in the embodiment of the present invention.
Figure 11:
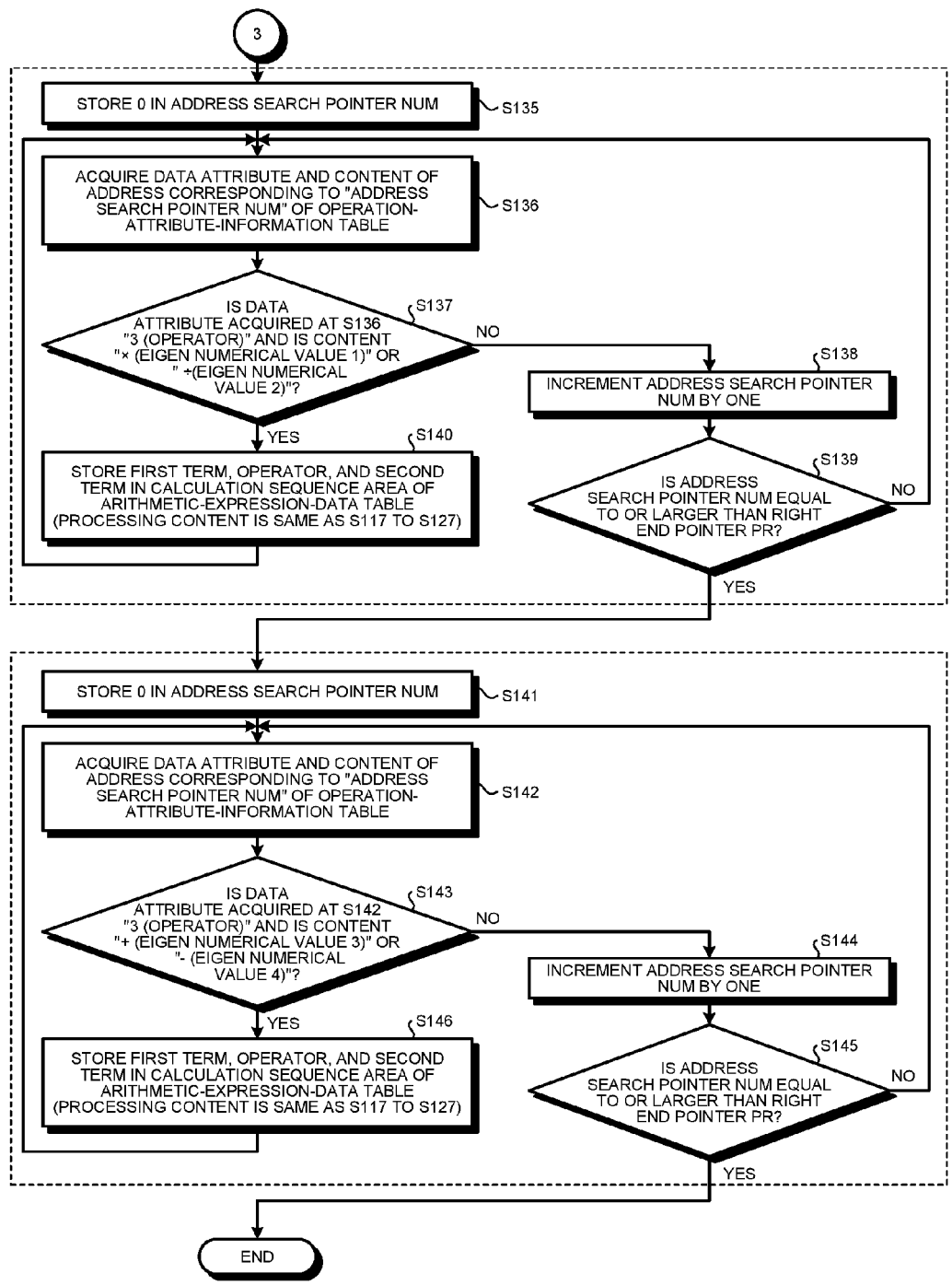
FIG. 11 is a chart for explaining the example of the processing flow of the arithmetic-expression processing unit of the arithmetic-expression-data creation tool in the embodiment of the present invention.

As explained above, the arithmetic expression data stored in the operation-attribute-information table 142 are resolved into binomials in the arithmetic-expression processing unit 520, and the storage order is determined to be a calculation order to be done, and then the binomials are stored in the arithmetic-expression-data table 141. FIGS. 9 to 11 are charts for explaining an example of a processing flow of the arithmetic-expression processing unit 520 of the arithmetic-expression-data creation tool 500 in the embodiment of the present invention. Note that FIGS. 9 to 11 are an example of a processing procedure, and the invention is not limited to this procedure.

In this procedure, as explained above, resolution into binomials is performed by searching through the data attributes of the addresses of the operation-attribute-information table 142. "Addresses" in the procedure explained below indicate addresses of the operation-attribute-information table 142 except for addresses of the shared memory 140. In the flow, the number-of-times-of-calculation Sequence represents the number of times of operations of binomials. An "address search pointer NUM" represents an address currently searched in the operation-attribute-information table 142.

First, in FIG. 9, the arithmetic-expression processing unit 520 initializes the number of times of calculation to 0. That is, the "number-of-times-of-calculation Sequence" is set to 0 (step S101). The arithmetic-expression processing unit 520 initializes the "address search pointer NUM" of the operation-attribute-information table 142 as the "address search pointer NUM"=0 (step S102).

Subsequently, the arithmetic-expression processing unit 520 searches for a parenthesized term in the arithmetic expression (steps S103 to S111). When a plurality of parentheses are present in the arithmetic expression, on the basis of a rule that an arithmetic expression parenthesized by parentheses on the innermost side is calculated first, in searching for the parenthesized term, after searching for a close parenthesis present on the leftmost side in the arithmetic expression (step S103 to S106), the arithmetic-expression processing unit 520 searches for an open parenthesis corresponding to the close parenthesis (steps S107 to S111).

First, the arithmetic-expression processing unit 520 searches for a close parenthesis according to a procedure explained below. First, the arithmetic-expression processing unit 520 acquires a data attribute and content of an address corresponding to the "address search pointer NUM" (step S103). The arithmetic-expression processing unit 520 determines whether or not the "data attribute" acquired at step S103 is "2 (a close parenthesis)" and the "content" is "1 (present)" (step S104). If one of the conditions is not satisfied (No at step S104), the arithmetic-expression processing unit 520 increments the "address search pointer NUM" by one (step S105) and determines whether or not the "address search pointer NUM" is equal to or larger than the "right end pointer PR" (step S106). If the "address search pointer NUM" is smaller than the "right end pointer PR" (No at step S106), the arithmetic-expression processing unit 520 shifts to step S103 and searches for the next address.

If the data attribute acquired at step S103 is "2 (a close parenthesis)" and the content is "1: (present)" (Yes at step S104), a close parenthesis that closes a term to be calculated first is present in the address indicated by the "address search pointer NUM". Therefore, the arithmetic-expression processing unit 520 detects an open parenthesis corresponding to the found close parenthesis (steps S107 to S111).

The open parenthesis corresponding to the close parenthesis, which has been found at step S104, is an open parenthesis present on the left side of the close parenthesis and closest to the close parenthesis. For this reason, the open parenthesis is searched as explained below. First, the arithmetic-expression processing unit 520 decrements the "address search pointer NUM" by one (step S107) and acquires a "data attribute" and "content" of the address corresponding to the "address search pointer NUM" in the operation-attribute-information table 142 (step S108). The arithmetic-expression processing unit 520 determines whether or not the "data attribute" acquired at step S108 is "1 (an open parenthesis)" and the "content" is "1 (present)" (step S109). If one of the conditions is not satisfied (No at step S109), the arithmetic-expression processing unit 520 determines whether or not the "address search pointer NUM" is 0 or less (step S110). If the "address search pointer NUM" is 0 or less (Yes at step S110), an open parenthesis to be paired with the close parenthesis detected at step S104 cannot be found in the arithmetic expression. Therefore, the arithmetic-expression processing unit 520 notifies the user of an error (step S111) and ends the processing. On the other hand, if the "address search pointer NUM" is 1 or more at step S110 (No at step S110), the arithmetic-expression processing unit 520 shifts to step S107 and further searches for the previous address.

If the "data attribute" of the address corresponding to the "address search pointer NUM" is "1 (an open parenthesis)" and the "content" is "1 (present)" at step S109 (Yes at step S109), an open parenthesis that parenthesizes a term to be calculated first is present in the address indicated by the "address search pointer NUM". The close parenthesis found at step S104 and the open parenthesis found at step S109 are parentheses on the innermost side. Therefore, an arithmetic expression parenthesized by these parentheses is supposed to be an expression to be calculated first.

Subsequently, as shown in FIG. 10, the arithmetic-expression processing unit 520 detects a binomial present between the detected parentheses (steps S112 to S134). In the case where the four basic arithmetic operations are performed in compliance with a rule that multiplication and division are calculated earlier than addition and subtraction, when detecting binomials, the arithmetic-expression processing unit 520 performs searching for binomials of multiplication and division (step S112 to S127), and thereafter searches for binomials of addition and subtraction (step S128 to S134).

The binomial of multiplication or division is found by searching for an operator "×" or an operator "÷". First, the arithmetic-expression processing unit 520 adds 1 to the "address search pointer NUM" (step S112), and acquires the "data attribute" and the "content" of the address corresponding to the "address search pointer NUM" of the operation-attribute-information table 142 (step S113). The arithmetic-expression processing unit 520 determines whether or not the "data attribute" acquired at step S113 is "3: (operator)" and the "content" is "1 (×)" or "2 (÷)" (step S114). If the data attribute acquired at step S114 is not "3 (operator)" or the content is other than "1 (×)" and "2 (÷) (No at step S114), the arithmetic-expression processing unit 520 increments the "address search pointer NUM" by one (step S115), and determines whether or not the "address search pointer NUM" is equal to or larger than the address found at step S104, that is, the address at which the close parenthesis is stored (step S116). If the address is smaller than the address at which the close parenthesis is stored (No at step S116), the arithmetic-expression processing unit 520 shifts to step S113.

If the data attribute acquired at step S114 is "3 (operator)" and the content is "1 (x)" or "2 (÷)" (Yes at step S114), a term related to this operator is a binomial to be calculated first.

Subsequently, the arithmetic-expression processing unit 520 detects a first term related to the operator detected at step S114. The first term related to the operator is present on the left side of the operator and is a value closest to the operator. For this reason, a search is performed as explained below. The arithmetic-expression processing unit 520 decrements the "address search pointer NUM" by one (step S117) and acquires a "data attribute" and a "content" of the address corresponding to the "address search pointer NUM" of the operation-attribute-information table 142 (step S118). The arithmetic-expression processing unit 520 determines whether or not the "data attribute" acquired at step S118 is "4 (value)" and the "content" is other than "0 (blank)" (step S119). If the conditions are not satisfied (No at step S119), the arithmetic-expression processing unit 520 shifts to step S117 and further searches for the previous address. If the "data attribute" acquired at step S114 is "4 (value)" and the "content" is other than "0 (blank)" (Yes at step S119), this term is the first term related to the operator detected at step S114.

Subsequently, a second term related to the operator detected at step S114 is detected. Because the second term related to the operator is present on the right side of the operator and closest to the operator, the second term is searched as explained below. First, the arithmetic-expression processing unit 520 restores, to the "address search pointer NUM", the address found at step S114, that is, the address at which the operator is stored (step S120), increments the "address search pointer NUM" by one (step S121), and acquires a "data attribute" and a "content" of the address corresponding to the "address search pointer NUM" of the operation-attribute-information table 142 (step S122). The arithmetic-expression processing unit 520 determines whether or not the "data attribute" acquired at step S122 is "4 (value)" and the "content" is other than "0 (blank)" (step S123). If the conditions are not satisfied (No ate step S123), the arithmetic-expression processing unit 520 shifts to step S121 and searches for the next address. If the "data attribute" acquired at step S122 is "4 (value)" and the "content" is other than "0 (blank)" (Yes at step S123), this term is supposed to be the second term related to the operator detected at step S114.

The binomial expression to be calculated first is established by the processing performed so far. Therefore, the arithmetic-expression processing unit 520 adds 1 to the "number-of-times-of-calculation Sequence" (step S124) and transfers the expression to the arithmetic-expression-data table 141. The arithmetic-expression processing unit 520 stores, in a calculation sequence area indicated by the "number-of-times-of-calculation Sequence" of the arithmetic-expression-data table 141, the content "first term" of the address found at step S119, the content "operator" of the address found at step S114, and the content "second term" of the address found at step S123 (step S125). That is, the arithmetic-expression processing unit 520 stores the first term, the operator and the second term in the calculation sequence area of a number indicated by the "number-of-times-of-calculation Sequence". Further, the arithmetic-expression processing unit 520 stores, in the address in which the first term is stored, addresses 29 to 36 representing a result of calculation indicated by the "number-of-times-of-calculation Sequence" (step S126), and stores 0, that is, blank in the addresses in which the operator and the second term are stored (step S127). The binomial to be calculated in the sequence indicated by the "number-of-times-of-calculation Sequence" has been able to be stored by the procedure performed so far, and then it shifts to step S113 and searches for the next operator.

If, at step S116, the "address search pointer NUM" is equal to or larger than the address in which the close parenthesis is stored, that is, the address found at step S104 (Yes at step S116), the search for the binomials of multiplication and division between the parentheses is completed, and so the arithmetic-expression processing unit 520 shifts to a step for detecting binomials of addition and subtraction between parentheses (step S128 to S134).

First, the arithmetic-expression processing unit 520 restores, to the "address search pointer NUM", the address in which the open parenthesis is stored, that is, the address found at step S109 (step S128), and acquires a "data attribute" and a "content" of the address corresponding to the "address search pointer NUM" of the operation-attribute-information table 142 (step S129). The unit 520 determines whether or not the "data attribute" acquired at step S129 is "3 (operator)" and the content is "3 (+)" or "4 (−)" (step S130), and if one of the conditions is not satisfied (No at step S130), the unit 520 adds 1 to the "address search pointer NUM" (step S131) and determines whether or not the "address search pointer NUM" is equal to or larger than the address in which the close parenthesis is stored (the address found at step S104) (step S132). If the "address search pointer NUM" is smaller than the address in which the close parenthesis is stored (the address found at step S104) (No at step S132), the unit 520 shifts to step S129 and further searches for the next address. At step S130, if the data attribute of the address corresponding to the "address search pointer NUM" is "3 (operator)" and the content is "3 (+)" or "4 (−)" (Yes at step S130), the unit 520 carries out the same processing as in steps S117 to S127 (step S133), stores the binomial in the calculation sequence area, and returns to step S129.

At step S132, if the "address search pointer NUM" is equal to or larger than the address in which the close parenthesis is stored (Yes at step S132), the search for the arithmetic expression between the parentheses has been completed, and so the unit 520 stores "0 (blank)" in the contents of the address in which the close parenthesis is stored, that is, the address found at step S104 and the address in which the open parenthesis is stored, that is, the address found at step S109 (step S134), shifts to step S103, and searches for parentheses to be calculated next.

The procedure explained above is repeated, and if the "address search pointer NUM" is equal to or larger than the "right end pointer PR" at step S106 (Yes at step S106), the search has been completed up to the end of the arithmetic expression, and so the arithmetic-expression processing unit 520 ends the step for determining a parenthesis and shifts to a step for searching for an arithmetic expression on the outside of the parenthesis as shown in FIG. 11 (steps S135 to S146). Also on the outside of the parentheses, according to the calculation sequence of the four arithmetic operations, the arithmetic-expression processing unit 520 searches for binomials of multiplication and division (steps S135 to S140) and thereafter searches for binomials of addition and subtraction (steps S141 to S146).

First, the arithmetic-expression processing unit 520 sets the "address search pointer NUM" to 0, that is, turns it back to the top (step S135) and acquires a "data attribute" and a "content" of the address corresponding to the "address search pointer NUM" of the operation attribute information table 142 (step S136). The unit 520 determines whether or not the "data attribute" acquired at step S136 is "3 (operator)" and the "content" is "1 (×)" or "2 (÷)" (step S137). If one of the conditions is not satisfied (No at step S137), the unit 520 increments the "address search pointer NUM" by one (step S138) and determines whether or not the "address search pointer NUM" is equal to or larger than the "right end pointer PR" (step S139). If the "address search pointer NUM" is smaller than the "right end pointer PR" (No at step S139), the arithmetic-expression processing unit 520 shifts to step S136 and searches for the next address. If the "data attribute" of the address corresponding to the "address search pointer NUM" is "3 (operator)" and the "content" is "1 (×)" or "2 (÷)" at step S137 (Yes at step S137), the arithmetic-expression processing unit 520 implements the same processing as in steps S117 to S127 (step S140), stores the binomials in the calculation sequence area, and returns to step S136.

At step S139, if the "address search pointer NUM" is equal to or larger than the "right end pointer PR" (Yes at step S139), the arithmetic-expression processing unit 520 ends the step for searching for binomials of multiplication and division and shifts to a step for detecting binomials of addition and subtraction (steps S141 to S146). First, the arithmetic-expression processing unit 520 sets the "address search pointer NUM" to 0, that is, turns it back to the top (step S141), and acquires a "data attribute" and a "content" of the address corresponding to the "address search pointer NUM" of the operation-attribute-information table 142 (step S142). The arithmetic-expression processing unit 520 determines whether or not the data attribute acquired at step S142 is "3 (operator)" and the content is "3 (+)" or "4 (−)" (step S143). If one of the conditions is not satisfied (No at step S143), the arithmetic-expression processing unit 520 increments the "address search pointer NUM" by one (step S144) and determines whether or not the address of the "address search pointer NUM" is equal to or larger than the "right end pointer PR" (step S145). If the "address search pointer NUM" is smaller than the "right end pointer PR" (No at step S145), it shifts to step S142. At step S143, if the data attribute of the address corresponding to the "address search pointer NUM" is "3 (operator)" and the content is "3 (+)" or "4 (−)" (Yes at step S143), the arithmetic-expression processing unit 520 proceeds to step S146 and stores, in the calculation sequence area indicated by the "number-of-times-of-calculation Sequence" of the arithmetic-expression-data table 141, the "first term", which is the content of the address found at step S119 in the procedure of steps S117 to S127, the "operator", which is the content of the address found at step S114, and the "second term", which is the content of the address found at step S123. At step S145, if the "address search pointer NUM" is equal to or larger than the "right end pointer PR" (Yes at step S145), the step for detecting the binomials of addition and subtraction has been completed and the search for an arithmetic expression on the outside of the parentheses has been completed, and so this processing is ended.

As above, the description has been given for the processing for transferring the arithmetic expression data to the arithmetic-expression-data table 141.

Figure 12:
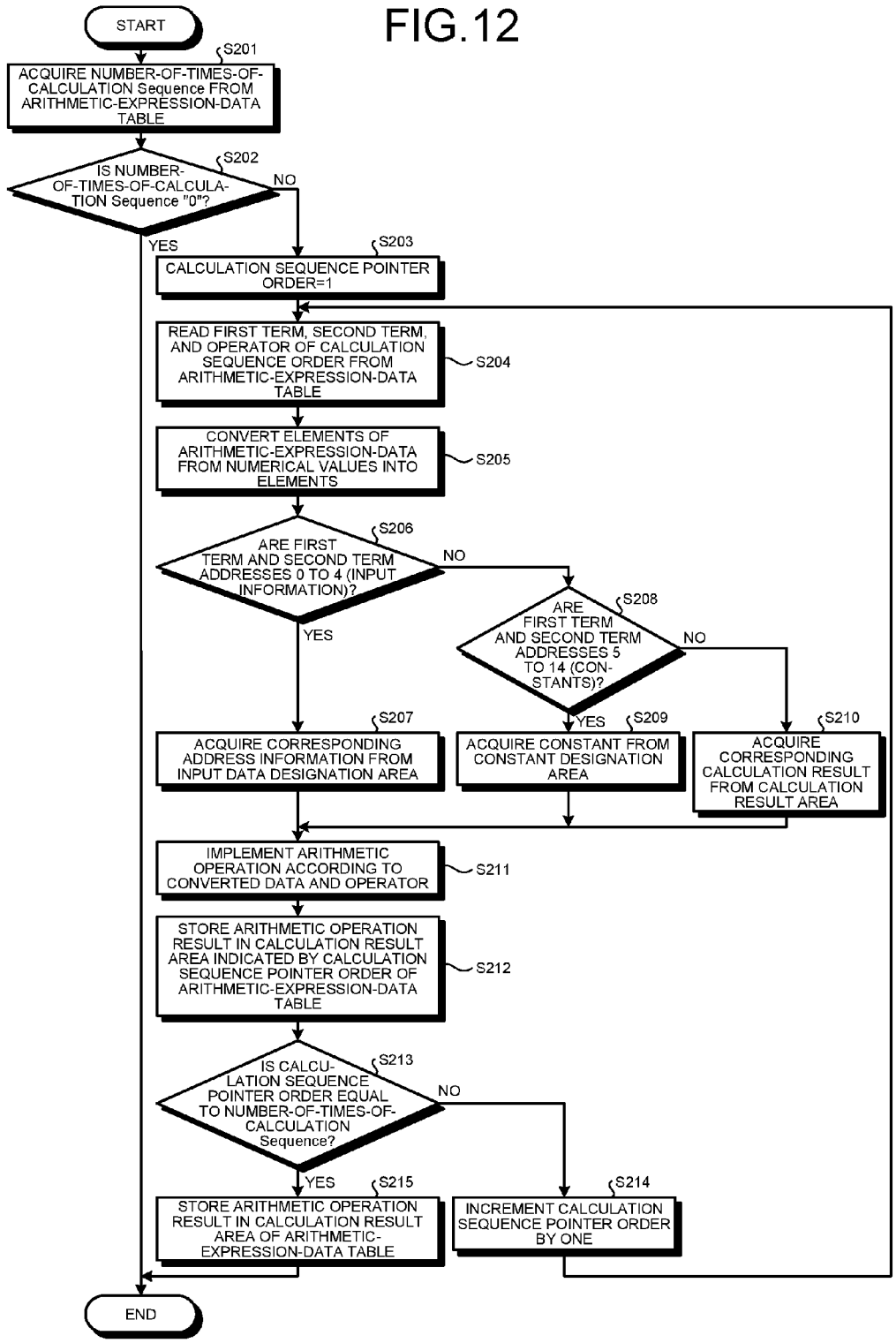
FIG. 12 is a flowchart for explaining the operation of a sequencer unit in the embodiment of the present invention.

A method in which the sequencer unit 100 implements polynomial arithmetic operation is explained below on the basis of the operation-attribute-information table 142. FIG. 12 is a diagram showing a flowchart for explaining the operation of the sequencer unit 100 in the embodiment of the present invention. A "calculation sequence pointer ORDER" in the flow represents the number of times of calculation of binomials. Every time a binomial is calculated, the sequencer unit 100 increments the "calculation sequence pointer ORDER" by one. When the "calculation sequence pointer ORDER" has a value equal to the "number-of-times-of-calculation Sequence", the sequencer unit 100 determines that calculation of the entire arithmetic expression has been completed.

First, the sequencer unit 100 reads the "number-of-times-of-calculation Sequence" at an address 27 of the arithmetic-expression-data table 141 (step S201). Subsequently, determination of whether or not the "number-of-times-of-calculation Sequence" is 0 is made (step S202).

If the "number-of-times-of-calculation Sequence" is 0 (Yes at step S202), the arithmetic processing is ended. If the "number-of-times-of-calculation Sequence" is other than 0 at step S202 (No at step S202), the sequencer unit 100 stores 1 in the "calculation sequence pointer ORDER" (step S203), and reads a first term, an operator and a second term from the calculation sequence area indicated by the "calculation sequence pointer ORDER" of the arithmetic-expression-data table 141 (step S204). The sequencer unit 100 converts the read data from numerical values into elements of an arithmetic expression (step S205) and implements an arithmetic operation according to the converted data (steps S206 to S211). At step S206, it is determined whether or not the first term and the second term are addresses 0 to 4. If the first term and the second term are the addresses 0 to 4 (Yes at step S206), the sequencer unit 100 acquires address information from the "input data designation area" of the arithmetic-expression-data table 141 (step S207).

If the first term and the second term are other than the addresses 0 to 4 (No at step S206), it is determined whether or not the first term and the second term are the addresses 5 to 14 (step S208). If the first term and the second term are the addresses 5 to 14 (Yes at step S208), the sequencer unit 100 acquires a direct value and a decimal point position from the "constant designation area" and converts them into a constant (step S209). If the first term and the second term are other than the addresses 0 to 14 (No at step S208), the sequencer unit 100 acquires a corresponding calculation result from the "calculation result area" (step S210). After steps S207, S209 and S210, the sequencer unit 100 implements an arithmetic operation according to the converted data and the operator (step S211). The sequencer unit 100 stores an arithmetic operation result of the binomial in the "calculation result area" indicated by the "calculation sequence pointer ORDER" of the arithmetic-expression-data table 141 (step S212).

Subsequently, the sequencer unit 100 compares the "calculation sequence pointer ORDER" and the "number-of-times-of-calculation Sequence" and determines whether or not they are identical with each other (step S213). If they are different from each other (No at step S213), the sequencer unit 100 adds 1 to the "calculation sequence pointer ORDER" (step S214) and shifts to step S204. At step S213, if the "calculation sequence pointer ORDER" is equal to the "number-of-times-of-calculation Sequence" (Yes at step S213), the arithmetic operation of the entire arithmetic expression has been completed, and so the sequencer unit 100 stores the arithmetic operation result in the "calculation result area" of the arithmetic-expression-data table 141 (step S215) and ends the arithmetic operation processing.

As above, it is possible to calculate any polynomial arithmetic expression desired by the user in the sequencer unit 100.

On the other hand, when the arithmetic expression data are restored to the arithmetic-expression input area 510, the arithmetic expression data expanded in the operation-attribute-information table 142 is converted from numerical value data into arithmetic expression data according to the data attribute, the operator constant and the parenthesis constant shown in FIG. 8, thereby to be able to realize such restoration.

The method of restoring the arithmetic expression data is explained above. By virtue of providing the arithmetic-expression-data table 141 and the operation-attribute-information table 142 in this way, it is possible to cause the sequencer unit 100 to quickly calculate a polynomial arithmetic expression desired by the user, and to restore the polynomial arithmetic expression read out from the sequencer unit 100 onto the arithmetic-expression-data creation tool 500 within the peripheral apparatus 2000.

In the following explanation, an A/D conversion unit is used as the sequencer unit 100. A digital value of CH1 of the A/D conversion unit is stored in the address 11 of the shared memory 140, and a digital value of CH2 of the A/D conversion unit is stored in the address 12 of the shared memory 140. Processing in causing the A/D conversion unit to calculate the undernoted (Expression 1) is explained using a specific example.

$$A \times ((30.123+B) \div 100) \quad \text{(Expression 1)}$$

In (Expression 1), A and B represents the following.
A: The digital value of CH1 of the A/C conversion unit
B: The digital value of CH2 of the A/D conversion unit
That is, (Expression 1) indicates an arithmetic expression for calculating a sum of the digital value of CH2 and a constant 30.123, further calculating a quotient of the sum and a constant 100, and yet further calculating a product of the quotient and the digital value of CH1.

Figure 13:
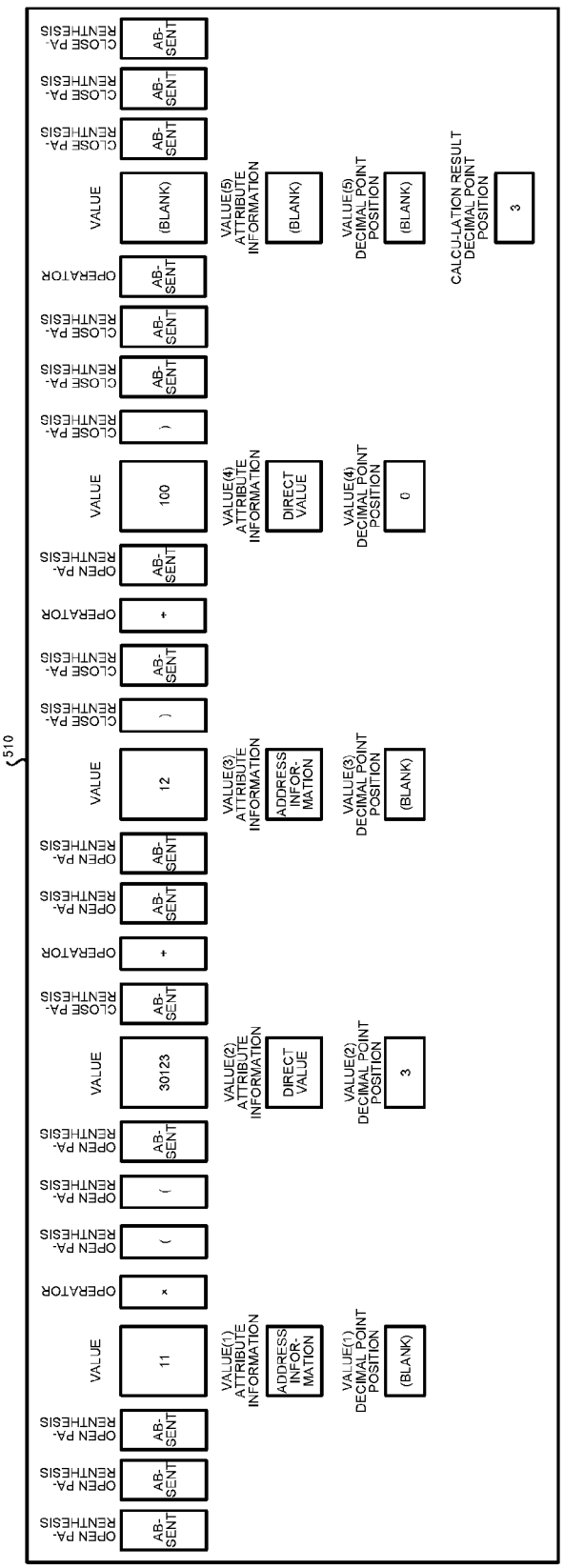
FIG. 13 is a diagram showing an example in which an arithmetic expression is created on the arithmetic-expression-data creation tool in the embodiment of the present invention.

FIG. 13 is a diagram showing an example in which an arithmetic expression is created on the arithmetic-expression-data creation tool 500 in the embodiment of the present invention. FIG. 13 shows processing performed when (Expression 1) is inputted to the arithmetic-expression input area 510. For a calculation result, three digits after the decimal point are displayed. Therefore, 3 is inputted to the "calculation result decimal point position" of the arithmetic-expression input area 510. After inputting the arithmetic expression, the user presses down the unit write button 52 included in the arithmetic-expression-data creation tool 500. When the unit write button 52 is pressed down, the arithmetic-expression-data creation tool 500 performs registration processing for the arithmetic expression in the arithmetic-expression processing unit 520.

Figure 14:
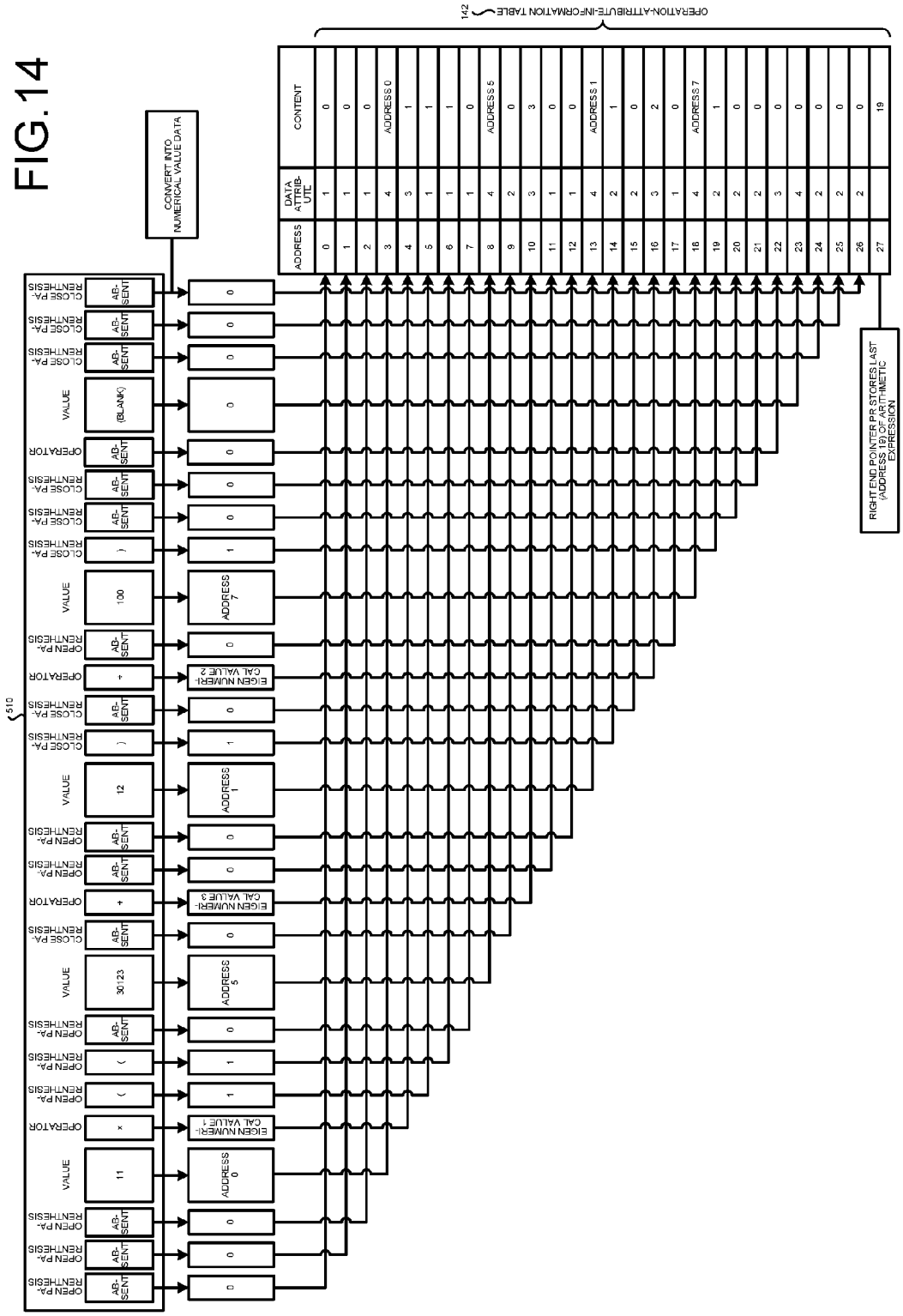
FIG. 14 is a diagram for explaining processing for storing, in the operation-attribute-information table in the arithmetic-expression-data creation tool, an example of the arithmetic expression created on the arithmetic-expression-data creation tool in the embodiment of the present invention.

FIG. 14 is a diagram for explaining processing for storing (Expression 1), which is an example of the arithmetic expression created on the arithmetic-expression-data creation tool 500 in the embodiment of the present invention, in the operation-attribute-information table 142 in the arithmetic-expression-data creation tool 500. As shown in FIG. 14, among the arithmetic expression data inputted in the arithmetic-expression input area 510, the constant of the arithmetic expression, the input information to the sequencer unit 100, the operator, the open parenthesis, and the close parenthesis are converted into numerical value data and stored in the operation-attribute-information table 142. Besides, in the "right end pointer PR" of the operation-attribute-information table 142, a numerical value "19"

representing the address, in which the last data of the arithmetic expression is stored, is stored.

Processing for transferring (Expression 1) stored in the operation-attribute-information table 142 to the arithmetic-expression-data table 141 is explained. First, the "number-of-times-of-calculation Sequence" is initialized to 0 (step S101 in FIG. 9), and the "address search pointer NUM" of the operation-attribute-information table 142 is initialized to 0 (step S102). Subsequently, resolution into binomials and a search for calculation sequence are performed. First, in a procedure explained below, the arithmetic-expression processing unit 520 searches for a close parenthesis at the top. Because the "address search pointer NUM" is 0, the arithmetic-expression processing unit 520 acquires a "data attribute" and a "content" of the address 0 (step S103) and determines whether or not the acquired "data attribute" is "2 (close parenthesis)" and the acquired "content" is "1 (present)" (step S104). The data attribute of the address 0 of the operation-attribute-information table 142 is "1 (open parenthesis)" (No at step S104). Therefore, the arithmetic-expression processing unit 520 increments the "address search pointer NUM" by one (step S105), sets the "address search pointer NUM" to 1, and determines whether or not the "address search pointer NUM" is equal to or larger than the "right end pointer PR" (step S106). The "address search pointer NUM", which is 1, is smaller than the "right end pointer PR", which is 19 (No at step S106), and therefore, it shifts to step S103. Thereafter, the arithmetic-expression processing unit 520 repeats steps S103 to S106 until the address 14, the "data attribute" of which is "2 (close parenthesis)" and the "content" of which is "1 (present)", is stored in the "address search pointer NUM".

When the "address search pointer NUM" becomes 14, at step S104, the "data attribute" of an address corresponding to the "address search pointer NUM" is "2 (close parenthesis)" and the "content" of the address is "1 (present)" (Yes at step S104). Therefore, a close parenthesis that parenthesizes a term to be calculated first is present in the address indicated by the "address search pointer NUM". Subsequently, the arithmetic-expression processing unit 520 detects an open parenthesis corresponding to the found close parenthesis (steps S107 to S111).

The open parenthesis corresponding to the close parenthesis found at step S104 is an open parenthesis present on the left side of the close parenthesis and closest to the close parenthesis. Therefore, the open parenthesis is searched as explained below. First, the arithmetic-expression processing unit 520 decrements the "address search pointer NUM" by one (step S107), sets the "address search pointer NUM" to 13, and acquires a "data attribute" and a "content" of an address corresponding to the "address search pointer NUM" of the operation-attribute-information table 142 (step S108). The "data attribute" acquired at step S108 is "4 (value)" (No at step S109). Therefore, the arithmetic-expression processing unit 520 determines whether or not the "address search pointer NUM" is 0 or less (step S110). At step S110, the "address search pointer NUM" (=13) is 1 or more (No at step S110), and so it shifts to step S107 and further searches for the previous address. Thereafter, the arithmetic-expression processing unit 520 repeats steps S107 to S110 until 6 is stored in the "address search pointer NUM".

Thereafter, when the "address search pointer NUM" becomes 6, a "data attribute" corresponding to the "address search pointer NUM" is "1 (open parenthesis)" and a "content" corresponding to the same is "1 (present)" (Yes at step S109), and so an open parenthesis that parenthesizes a term to be calculated first is present in an address indicated by the "address search pointer NUM". The open parenthesis of the address 6 and the close parenthesis of the address 14 found as explained above are parentheses on the innermost side. Therefore, an arithmetic expression parenthesized by these parentheses is an expression to be calculated first.

Subsequently, the arithmetic-expression processing unit 520 detects binomials present between the detected parentheses (steps S112 to S134). At this time, according to the calculation sequence of the four arithmetic operations, after searching for binomials of multiplication and division (steps S112 to S127), the arithmetic-expression processing unit 520 searches for binomials of addition and subtraction (steps S128 to S134).

The binomials of multiplication and division between the parentheses are found by searching for an operator "×" and an operator "÷". First, the arithmetic-expression processing unit 520 adds 1 to the "address search pointer NUM" (step S112), sets the "address search pointer NUM" to 7, and acquires a "data attribute" and a "content" of the address 7 corresponding to the "address search pointer NUM" of the operation-attribute-information table 142 (step S113). The "data attribute" of the address 7 is "1 (open parenthesis)" (No at step S114), and therefore, the arithmetic-expression processing unit 520 increments the "address search pointer NUM" by one (step S115), sets the "address search pointer NUM" to 8, and determines whether or not the "address search pointer NUM" is equal to or larger than the address found at step S104, that is, the address in which the close parenthesis is stored (step S116). The "address search pointer NUM" (=8) is smaller than the address (=14) in which the close parenthesis is stored (No at step S116), and so it shifts to step S113. Thereafter, the arithmetic-expression processing unit 520 repeats steps S113 to S116 until 14 is stored in the "address search pointer NUM".

When the "address search pointer NUM" becomes 14, at step S116, the "address search pointer NUM" is equal to or larger than the address "14" in which the close parenthesis is stored (Yes at step S116), and the search for the arithmetic expressions of multiplication and division between the parentheses has been completed, and so it shifts to a step for detecting terms of the operator "+" and the operator "−" between the parentheses (steps S128 to S134).

First, the arithmetic-expression processing unit 520 restores the address "6" in which the open parenthesis is stored in the "address search pointer NUM" (step S128) and acquires a "data attribute" and a "content" of an address corresponding thereto (step S129). Thereafter, the arithmetic-expression processing unit 520 increments the address search pointer and searches for terms of addition and subtraction (steps S129 to S133) and increments the "address search pointer NUM" up to 10.

When 10 is stored in the "address search pointer NUM", at step S130, a "data attribute" of an address corresponding to the "address search pointer NUM" is "3 (operator)" and "content" of the address is "3 (+)" (Yes at step S130). Therefore, terms related to this operator are a binomial to be calculated first. Therefore, the arithmetic-expression processing unit 520 proceeds to step S133 and stores, in the calculation sequence area of the arithmetic-expression-data table 141, a first term related to the operator detected at step S130, the operator detected at step S130, and a second term related to the operator detected at step S130. At step S133, processing same as steps S117 to S127 is executed.

Specifically, first, the arithmetic-expression processing unit 520 detects a first term related to the operator detected at step S130. The first term related to the operator is a value present on the left side of the operator and closest to the operator, and so searching is performed as explained below. The arithmetic-expression processing unit 520 decrements the "address search pointer NUM" by one (step S117), sets the "address search pointer NUM" to 9, and acquires a "data attribute" and a "content" of the address corresponding to the "address search pointer NUM" of the operation-attribute-information table 142 (step S118). The "data attribute" of the address 9 is "2 (close parenthesis)" (No at step S119), and so it shifts to step S117. Thereafter, the arithmetic-expression processing unit 520 repeats steps S117 to S119 until 8 is stored in the "address search pointer NUM".

When the "address search pointer NUM" becomes 8, the "data attribute" of the address corresponding to the "address search pointer NUM" is "4 (value)" and the "content" of the address is the address 5 (Yes at step S119), and therefore, this term is determined to be the first term related to the operator detected at step S114.

Subsequently, a second term related to the operator detected at step S130 is detected. The second term related to the operator is a value present on the right side of the operator and closest to the operator, and so searching is performed as explained below. First, the arithmetic-expression processing unit 520 restores, to the "address search pointer NUM", "10", which is the address found at step S130, that is, the address in which the operator is stored (step S120), increments the "address search pointer NUM" by one (step S121), sets the "address search pointer NUM" to 11, and acquires a "data attribute" and a "content" of the address "11" corresponding to the operation-attribute-information table 142 (step S122). The "data attribute" of the address 11 is "1 (open parenthesis)" (No at step S123), and so it shifts to step S121. Thereafter, the arithmetic-expression processing unit 520 repeats steps S121 to S123 until 13 is stored in the "address search pointer NUM".

When the "address search pointer NUM" becomes 13, at step S123, the "data attribute" of the address corresponding to the "address search pointer NUM" is "4 (value)" and the "content" of the address is the address 1 (Yes at step S123), and therefore, this term is determined to be the second term related to the operator detected at step S114.

The aforementioned process can make the binomial found. Therefore, the arithmetic-expression processing unit 520 adds 1 to the "number-of-times-of-calculation Sequence" (step S124), shifts to step S125, and performs transfer to the arithmetic-expression-data table 141. The arithmetic-expression processing unit 520 stores the "first term", which is the "content" of the address "8" found at step S119, the "operator", which is the "content" of the address "10" found at step S130, and the "second term", which is the "content" of the address "13" found at step S123, in the calculation sequence area corresponding to the "number-of-times-of-calculation Sequence" (=1) of the arithmetic-expression-data table 141 (step S125). Further, the arithmetic-expression processing unit 520 stores an address 29 representing a calculation result of the "number-of-times-of-calculation Sequence" (=1) in the address in which the first term is stored (step S126), stores 0, that is, blank in the address in which the operator and the second term are stored (step S127), ends step S133, shifts to step S129, and searches for the next operator.

Data stored in the arithmetic-expression-data table 141 and the operation-attribute-information table 142 as a result of the processing explained above are shown in FIGS. 15 and 16. It is seen that a value is stored in the calculation sequence area 1 of the arithmetic-expression-data table 141 and an expression to be calculated first is (30.123+a digital value of CH2).

As shown in FIGS. 15 and 16, there is no other binomial between the open parenthesis of the address 6 and the close parenthesis of the address 14. Therefore, the arithmetic-expression processing unit 520 repeats steps S129 to S132 until 14 is stored in the "address search pointer NUM".

When the "address search pointer NUM" becomes 14, at step S132, the "address search pointer NUM" is equal to or larger than the address "14" in which the close parenthesis is stored (Yes at step S132), and the search for the arithmetic expression between the parentheses is completed. Therefore, the arithmetic-expression processing unit 520 stores "0 (blank)" in the "contents" of the address "6" in which the open parenthesis is stored and the address "14" in which the close parenthesis is stored (step S134), shifts to step S103, and searches for parentheses to be calculated next.

Results of the arithmetic-expression-data table 141 and the operation-attribute-information table 142 after the procedure explained above is repeated and the search for inside of the parentheses in the arithmetic expression is completed are shown in FIGS. 17 and 18. It is seen that data are stored in the calculation sequence area 2 of the arithmetic-expression-data table 141 and an expression to be calculated second is ("result of the calculation sequence 1"÷100).

Subsequently, the arithmetic-expression processing unit 520 ends the step for determining parentheses and shifts to a step for searching for an operator (steps S135 to S146). Even on the outside of the parentheses, according to the calculation sequence of the four arithmetic operations, after searching for binomials of multiplication and division (steps S135 to S140), it searches for binomials of addition and subtraction (step S141 to S146).

First, the arithmetic-expression processing unit 520 decrements the "address search pointer NUM" to 0, that is, turns it back to the top (step S135) and acquires a "data attribute" and a "content" of the address corresponding to the "address search pointer NUM" (step S136). The "data attribute" of the address 0 is "1 (open parenthesis)" (No at step S137). Therefore, the arithmetic-expression processing unit 520 increments the "address search pointer NUM" by one (step S138) and determines whether or not the "address search pointer NUM" is equal to or larger than the "right end pointer PR" (step S139). The "address search pointer NUM" (=1) is smaller than the "right end pointer PR" (=19) (No at step S139), and so it shifts to step S136. Thereafter, steps S136 to S139 are repeated until 4 is stored in the "address search pointer NUM".

The "data attribute" of the address corresponding to the "address search pointer NUM"=4 is "3 (operator)" and the "content" of the address is "1 (×)" (Yes at step S137). Therefore, according to the procedure of steps S117 to S127, the arithmetic-expression processing unit 520 stores the "first term", the "operator", and the "second term" in the calculation sequence area of a number indicated by the "number-of-times-of-calculation Sequence" (step S140). Thereafter, because there is no arithmetic expression, steps S136 to S139 are repeated until 19 is stored in the "address search pointer NUM".

When the "address search pointer NUM" becomes 19, at step S139, the "address search pointer NUM" is equal to or larger than the "right end pointer PR" (Yes at step S139). Therefore, the arithmetic-expression processing unit 520 shifts to a step for detecting binomials of addition and subtraction between parentheses (steps S141 to S146). First, the arithmetic-expression processing unit 520 decrements the "address search pointer NUM" to 0, that is, turns it back to the top (step S141) and acquires a "data attribute" and a "content" of an address corresponding thereto (step S142).

Thereafter, the arithmetic-expression processing unit 520 increments the address search pointer until an address, the acquired "data attribute" of which is "3 (operator)" and the acquired "content" of which is "3 (+)" or (4 (−)", is found (steps S142 to S145). However, because there is no operator between the parentheses, the arithmetic-expression processing unit 520 increments the "address search pointer NUM" up to 19. When the "address search pointer NUM" becomes 19, at step S145, the "address search pointer NUM" is equal to or larger than the "right end pointer PR" (=19). Therefore, the step for detecting binomials of addition and subtraction is completed. According to the procedure explained above, the search for an arithmetic expression outside parentheses is completed, and so it ends the processing.

The transfer processing to the arithmetic-expression-data table 141 is explained above with reference to the specific example. FIGS. 19 and 20 are diagrams for explaining the arithmetic-expression-data table 141 and the operation-attribute-information table 142 after processing for writing the arithmetic expression data is performed.

Calculation processing in the sequencer unit 100 is explained with reference to FIG. 12. First, the sequencer unit 100 reads the "number-of-times-of-calculation Sequence" from the number-of-times-of-calculation storage area of the arithmetic-expression-data table 141 (step S201). The "number-of-times-of-calculation Sequence" (=3) is other than 0 (No at step S202). Therefore, the sequencer unit 100 initializes the "calculation sequence pointer ORDER" to 1 (step S203), reads the "address 5", which is the "content" of the first term, "3", which is the "content" of the operator, and the "address 1", which is the content of the second term, from the "calculation sequence area 1" indicated by the "calculation sequence pointer ORDER" (=1) of the arithmetic-expression-data table 141 shown in FIG. 19 (step S204), and converts the numerical value data into arithmetic expression data (step S205). The first term is other than the addresses 0 to 4 (No at step S206) and corresponds to the addresses 5 to 14 (Yes at step S208). Therefore, the sequencer unit 100 acquires a direct value and a decimal point position from the constant designation area and converts it into a constant (=30.123) (step S209).

On the other hand, the second term corresponds to the addresses 0 to 4 (Yes at step S206). Therefore, the sequencer unit 100 refers to the digital value of CH2 stored in the address 12 of the shared memory 140 stored in the address 1 shown in FIG. 19 (step S207).

Subsequently, the sequencer unit 100 implements an arithmetic operation (30.123+the digital value of CH2) according to the converted data (step S211). An arithmetic operation result is stored in addresses 29 and 30, which are the "calculation result area 1" indicated by the "calculation sequence pointer ORDER" (=1) of the arithmetic-expression-data table 141 (step S212).

Subsequently, the sequencer unit 100 compares the "calculation sequence pointer ORDER" (=1) and the "number-of-times-of-calculation Sequence" (=3) (step S213). They are different from each other (No at step S213), and so the sequencer unit 100 adds 1 to the "calculation sequence pointer ORDER" (step S214) and shifts to step S204.

Subsequently, the sequencer unit 100 reads the "address 29", which is the "content" of the first term, "2", which is the "content" of the operator, and the "address 7", which is the "content" of the second term, from the "calculation sequence area 2" indicated by the "calculation sequence pointer ORDER" (=2) of the arithmetic-expression-data table 141 shown in FIG. 19 (step S204) and converts the numerical value data into arithmetic expression data (step S205). The first term is other than the addresses 0 to 4 (No at step S206) and other than the addresses 5 to 14 (No at step S208). Therefore, the sequencer unit 100 refers to the addresses 29 and 30 shown in FIG. 19, which are the corresponding calculation result, from the calculation result area (step S210). The second term is other than the addresses 0 to 4 (No at step S206) and corresponds to the addresses 5 to 14 (Yes at step S208). Therefore, the sequencer unit 100 acquires a direct value and a decimal point position from the "constant designation area" and converts it into a constant (=100) (step S209).

Subsequently, the sequencer unit 100 implements an arithmetic operation (the calculation result 1÷100) according to the converted data (step S211). An arithmetic operation result is stored in addresses 31 and 32 shown in FIG. 19, which are the "calculation area 2" indicated by the "calculation sequence pointer ORDER" (=2) of the arithmetic-expression-data table 141 (step S212).

Subsequently, the sequencer unit 100 compares the "calculation sequence pointer ORDER" (=2) and the "number-of-times-of-calculation Sequence" (=3) (step S213). They are different from each other (No at step S213), and therefore, the sequencer unit 100 adds 1 to the "calculation sequence pointer ORDER" (step S214) and shifts to step S204.

Subsequently, the sequencer unit 100 reads the "address 0", which is the "content" of the first term, "1", which is the "content" of the operator, and the "address 31", which is the "content" of the second term, from the "calculation sequence area 3" indicated by the "calculation sequence pointer ORDER" (=3) of the arithmetic-expression-data table 141 shown in FIG. 19 (step S204) and converts the numerical value data into arithmetic expression data (step S205). The first term corresponds to the addresses 0 to 4 (Yes at step S206), and so the sequencer unit 100 refers the digital value of CH1 stored in the address 11 of the shared memory 140, corresponding thereto, from the "input data designation area" (step S207). The second term is other than the addresses 0 to 4 (No at step S206) and other than the addresses 5 to 14 (No at step S208), and so the sequencer unit 100 refers to calculation results in the addresses 31 and 32 shown in FIG. 19, which equate the corresponding "calculation result area 2".

Subsequently, the sequencer unit 100 implements an arithmetic operation (the digital value of CH1+the calculation result 2) according to the converted data (step S211). An arithmetic operation result is stored in a "calculation result 3" of addresses 33 and 34 shown in FIG. 19, which equate a "calculation result area" indicated by the "calculation sequence pointer ORDER" (=3) of the arithmetic-expression-data table 141 (step S212).

Subsequently, the sequencer unit 100 compares the "calculation sequence pointer ORDER" (=3) and the "number-of-times-of-calculation Sequence" (=3) (step S213). They are equal to each other (Yes at step S213), and therefore, the sequencer unit 100 stores the arithmetic operation results of the operations performed so far in a "calculation result" of a "calculation result area last" (addresses 37 and 38 shown in FIG. 19) of the arithmetic-expression-data table 141 (step S215), and the arithmetic operation processing is over.

As above, the procedure for causing the operation unit 130 of the sequencer unit 100 to calculate any polynomial arithmetic expression desired by the user has been explained.

Note that the arithmetic expression in the above embodiment covers, as one example, an arithmetic expression consisting of five terms at most. However, in an arithmetic expression consisting of N terms at most, when all of the terms of the arithmetic expression are represented by data of one word, a region necessary for storage of the data is (8N−1) words.

In addition, the number of elements of the operation-attribute-information table 142 is as follows:

$$2\times\left\{\sum_{n=1}^{N-1}(N-n)\right\} \quad (1)$$

Note that, in the above embodiment, the arithmetic-expression-data table 141 is registered in the shared memory 140, but the arithmetic-expression-data table 141 may be capable of being registered in a nonvolatile memory 145 in the PLC system 1. The nonvolatile memory 145 may be provided on the inside of the sequencer unit 100, but alternatively, as shown in FIG. 3, the nonvolatile memory 145 may be provided on the outside of the sequencer unit 100. In the case where the arithmetic-expression-data table 141 is registered in the nonvolatile memory 145, registered arithmetic expression data do not disappear even if a power supply of the sequencer unit 100 is turned off. Therefore, it is unnecessary to perform operation parameter setting from the arithmetic-expression-data creation tool 500 every time when the sequencer unit 100 is started up.

As explained above, the PLC system 1 according to this embodiment has a function capable of registering a created polynomial arithmetic expression in the sequencer unit and calculating the polynomial arithmetic expression inside the sequencer unit. Therefore, an operation program on a sequencer CPU is unnecessary. By doing so, it is possible to reduce man-hours for creating a ladder program while eliminating necessity for an operation program on the sequencer CPU. Further, it is possible to perform an advanced arithmetic operation not depending on a scan time of the sequencer CPU.

Further, the present invention is not limited to the above embodiment, and at an implementation stage, it can be variously modified within a scope that does not depart from the spirit of the present invention. Inventions involved at various stages are included in the above embodiment, and various inventions can be extracted according to appropriate combinations of a disclosed plurality of constituent elements disclosed herein. For example, when the problems described in a column of the Technical Problem can be solved and the effects described in a column of the Advantageous Effects of Invention can be obtained even if some constituent elements are deleted from all the constituent elements described in the embodiment, a configuration that does not have the deleted constituent elements can be extracted as an invention. Further, the constituent elements described in different embodiments can be combined as appropriate.

REFERENCE SIGNS LIST

1 PLC system
100 sequencer unit
130 operation unit
131 arithmetic-expression-data processing unit
140 shared memory
141 arithmetic-expression-data table
142 operation-attribute-information table
145 nonvolatile memory
160 bus I/F
170 internal bus
200 CPU device
210 external memory I/F
220 operation unit
230 internal memory
240 peripheral apparatus I/F
250 bus I/F
300 inter-unit bus
500 arithmetic-expression-data creation tool
510 arithmetic-expression input area
520 arithmetic-expression processing unit
1000 PLC
2000 peripheral apparatus

The invention claimed is:

1. A programmable logic controller (PLC) system comprising:
   a PLC including a PLC unit and a storing unit provided external to the PLC unit; and
   an arithmetic-expression-data-creation supporting apparatus that causes the PLC unit to create arithmetic expression data of an arithmetic expression to be executed by the PLC unit, wherein
   the arithmetic-expression-data-creation supporting apparatus includes:
      an input unit to receive, from a user, the arithmetic expression including input information serving as a variable used in an arithmetic operation and a constant used in the arithmetic operation; and
      an arithmetic-expression processing unit to obtain a calculation sequence of the arithmetic expression, resolve the arithmetic expression into binomials, and transfer the calculation sequence and the binomials to the PLC unit,
   the storing unit retains an arithmetic-expression-data table for managing the arithmetic expression data including the input information, the constant and the calculation sequence, and
   the PLC unit includes an operation unit that is connected to the storing unit, the operation unit being configured to execute the arithmetic operation of the arithmetic expression according to the calculation sequence using the input information, the constant, and the binomials, without using a ladder program, and thereby control movement of a hardware unit according to the executed arithmetic operation.

2. The PLC system according to claim 1, wherein
   the arithmetic-expression-data-creation supporting apparatus creates an operation-attribute-information table for managing a data attribute and content of an element included in the arithmetic expression, and
   the PLC is connected to the storing unit and writes the input information, the constant and the calculation sequence in the arithmetic-expression-data table using the operation-attribute-information table.

3. The PLC system according to claim 1, wherein
   the arithmetic-expression processing unit obtains priorities of calculations of the binomials, and
   the PLC writes the binomials in the arithmetic-expression-data table according to the priorities.

4. An arithmetic-expression-data-creation supporting apparatus comprising:
   an input unit to receive, from a user, an arithmetic expression including input information serving as a variable used in an arithmetic operation executed by a programmable logic controller (PLC) unit and a constant used in the arithmetic operation; and
   an arithmetic-expression processing unit to obtain a calculation sequence of the arithmetic expression, resolve the arithmetic expression into binomials, and transfer the calculation sequence and the binomials to the PLC unit, wherein the arithmetic-expression-data-creation supporting apparatus transfers the input information, the constant and the calculation sequence to a storing unit provided in a PLC including the PLC unit, to cause the PLC to execute the arithmetic operation of the arithmetic expression according to the calculation sequence using the input information, the constant, and the binomials, without using a ladder program, and thereby control movement of a hardware unit according to the executed arithmetic operation.

5. The arithmetic-expression-data-creation supporting apparatus according to claim 4, wherein the arithmetic-expression processing unit obtains priorities of calculations of the binomials.

6. A programmable logic controller (PLC) system comprising:

a PLC including a PLC unit having a storing unit provided within the PLC unit; and an arithmetic-expression-data-creation supporting apparatus that causes the PLC unit to create arithmetic expression data of an arithmetic expression to be executed by the PLC unit, wherein the arithmetic-expression-data-creation supporting apparatus includes:

an input unit to receive, from a user, the arithmetic expression including input information serving as a variable used in an arithmetic operation and a constant used in the arithmetic operation; and an arithmetic-expression processing unit to obtain a calculation sequence of the arithmetic expression, resolve the arithmetic expression into binomials, and transfer the calculation sequence and the binomials to the PLC unit, the storing unit retains an arithmetic-expression-data table for managing the arithmetic expression data including the input information, the constant and the calculation sequence, and the PLC unit includes an operation unit that is connected to the storing unit, the operation unit being configured to execute the arithmetic operation of the arithmetic expression according to the calculation sequence using the input information, the constant, and the binomials, without using a ladder program, and thereby control movement of a hardware unit according to the executed arithmetic operation.

7. The PLC system according to claim 6, wherein the arithmetic-expression-data-creation supporting apparatus creates an operation-attribute-information table for managing a data attribute and content of an element included in the arithmetic expression, and the PLC is connected to the storing unit and writes the input information, the constant and the calculation sequence in the arithmetic-expression-data table using the operation-attribute-information table.

8. The PLC system according to claim 6, wherein the arithmetic-expression processing unit obtains priorities of calculations of the binomials, and the programmable logic controller writes the binomials in the arithmetic-expression-data table according to the priorities.

* * * * *